US011109403B2

United States Patent
Moon et al.

(10) Patent No.: US 11,109,403 B2
(45) Date of Patent: *Aug. 31, 2021

(54) METHOD AND APPARATUS FOR SCHEDULING UPLINK DATA IN MOBILE COMMUNICATION SYSTEM

(71) Applicant: Samsung Electronics Co., Ltd., Suwon-si (KR)

(72) Inventors: Jungmin Moon, Suwon-si (KR); Seunghoon Park, Seoul (KR); Byounghoon Jung, Suwon-si (KR); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,888

(22) Filed: Nov. 25, 2019

(65) Prior Publication Data
US 2020/0092903 A1 Mar. 19, 2020

Related U.S. Application Data

(63) Continuation of application No. 16/233,569, filed on Dec. 27, 2018, now Pat. No. 10,873,961, which is a
(Continued)

(30) Foreign Application Priority Data

Aug. 11, 2016 (KR) .................. 10-2016-0102597
Mar. 23, 2017 (KR) .................. 10-2017-0037144
Jul. 21, 2017 (KR) .................. 10-2017-0092953

(51) Int. Cl.
*H04W 4/00* (2018.01)
*H04W 72/12* (2009.01)
(Continued)

(52) U.S. Cl.
CPC .... *H04W 72/1268* (2013.01); *H04W 72/0446* (2013.01); *H04W 72/1284* (2013.01); *H04W 72/14* (2013.01)

(58) Field of Classification Search
None
See application file for complete search history.

(56) References Cited

U.S. PATENT DOCUMENTS 10,172,153 B2 * 1/2019 Moon .............. H04W 72/1284
2007/0121542 A1 5/2007 Lohr et al.
(Continued)

FOREIGN PATENT DOCUMENTS

EP 1917763 A1 5/2008
EP 2485556 A1 8/2012
(Continued)

OTHER PUBLICATIONS

International Search Report, dated Oct. 25, 2017, regarding International Application No. PCT/KR2017/008406, 3 pages.
(Continued)

*Primary Examiner* — Clemence S Han

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Provided are a method and apparatus for uplink scheduling in a mobile communication system. The method of uplink scheduling for a user equipment (UE) in a mobile communication system may include identifying the amount of data stored in a buffer, generating a scheduling request
(Continued)

(SR), and transmitting the SR to a base station (NB) on the basis of the identified data amount so that an uplink resource is to be allocated from the NB.

20 Claims, 38 Drawing Sheets

Related U.S. Application Data continuation of application No. 15/674,452, filed on Aug. 10, 2017, now Pat. No. 10,172,153.

(51) Int. Cl.
*H04W 72/04* (2009.01)
*H04W 72/14* (2009.01)

(56) References Cited

U.S. PATENT DOCUMENTS

| | | |
|---|---|---|
| 2007/0201397 A1 | 8/2007 | Zhang |
| 2008/0225693 A1 | 9/2008 | Zhang et al. |
| 2008/0318607 A1 | 12/2008 | Torsner et al. |
| 2010/0202420 A1 | 8/2010 | Jersenius et al. |
| 2012/0069793 A1 | 3/2012 | Chung et al. |
| 2013/0163534 A1 | 6/2013 | Anderson et al. |
| 2014/0036885 A1 | 2/2014 | Moberg et al. |
| 2014/0133436 A1 | 5/2014 | Shiizaki et al. |
| 2015/0003391 A1 | 1/2015 | Chen |
| 2015/0043352 A1 | 2/2015 | Jang et al. |
| 2015/0117342 A1 | 4/2015 | Loehr et al. |
| 2015/0257144 A1 | 9/2015 | Hooli et al. |
| 2015/0334702 A1 | 11/2015 | Ji et al. |
| 2016/0021646 A1 | 1/2016 | Hu et al. |
| 2016/0050688 A1 | 2/2016 | Pan et al. |
| 2016/0066328 A1 | 3/2016 | Hu et al. |
| 2016/0081108 A1 | 3/2016 | Tseng |
| 2016/0128094 A1 | 5/2016 | Lee et al. |
| 2017/0202009 A1 | 7/2017 | Kim et al. |
| 2017/0310433 A1 | 10/2017 | Dinan |
| 2017/0310531 A1 | 10/2017 | Dinan |
| 2017/0311317 A1 | 10/2017 | Dinan |
| 2018/0014322 A1 | 1/2018 | Loehr et al. |

FOREIGN PATENT DOCUMENTS

| | | |
|---|---|---|
| EP | 2661138 A1 | 11/2013 |
| EP | 2827662 A1 | 1/2015 |
| JP | 2016-519879 A | 7/2016 |
| KR | 10-2016-0033059 A | 3/2016 |

OTHER PUBLICATIONS

LG Electronics, "Initial signal in LAA uplink", 3GPP TSG RAN WG1 meeting #85, R1-164505, May 2016, 3 pages.
Ericsson, "Uplink Resource Allocation Design for Enhanced LAA", 3GPP TSG-RAN WG1 meeting #85, R1-165141, May 2016, 5 pages.
European Patent Office, "Supplementary European Search Report," Application No. EP17839728.7, dated Apr. 3, 2019, 10 pages.
Institute for Information Industry (III), "Combined SR with BSR for reducing UP latency," R2-154411 (Revision of R2-153416), 3GPP TSG-RAN WG2 Meeting #91bis, Malmo, Sweden, Oct. 5-9, 2015, 4 pages.
Ericsson, "Uplink dynamic scheduling in NR", 3GPP TSG-RAN WG2 #97, Feb. 13-17, 2017, Tdoc R2-1700838, 6 pages.
Office Action dated Jul. 13, 2021 in connection with Japanese Patent Application No. 2019-507100, 8 pages.
European Patent Office, "Communication under Rule 71(3) EPC", in connection with European Patent Application No. 17 839 728.7 dated Jan. 25, 2021, 63 pages.

\* cited by examiner

FIG. 4

| m | 0 | 1 | 2 | 3 |
|---|---|---|---|---|
| BS (bytes) | 0 < BS < 300 | 300 < BS < 600 | 600 < BS < 900 | 900 < BS < 1200 |
| | Configurable by RRC | | | |

FIG. 8

| N | 1 | 2 | 3 |
|---|---|---|---|
| BS (bytes) | 0 < BS < 300 | 300 < BS < 600 | 600 < BS < 900 |
| | Configurable by RRC (same as option 1) | | |

FIG. 11

| Bitmap | 000 | 001 | 010 | 011 | 100 | 101 | 110 | 111 |
|---|---|---|---|---|---|---|---|---|
| BS (bytes) | 0 < BS < 300 | 300 < BS < 600 | 600 < BS < 900 | 900 < BS < 1200 | 1200 < BS < 1500 | 1500 < BS < 1800 | 1800 < BS < 2100 | 2100 < BS < 2400 |
| | | Configurable by RRC (same as option 1) | | | | | | |

FIG. 12

| PUCCH format | Bits per TTI | Modulation scheme | UCI information |
|---|---|---|---|
| 1 | - | - | Scheduling request |
| 1a | 1 | BPSK | 1-bit HARQ ACK/NACK with/without SR |
| 1b | 2 | QPSK | 2-bit HARQ ACK/NACK with/without SR<br>4-bit HARQ ACK/NACK with channel selection |
| 2 | 20 | QPSK | CSI with/without (1 or 2 bit HARQ ACK/NACK) |
| 2a | 21 | QPSK + BPSK | CSI and 1 bit HARQ ACK/NACK |
| 2b | 22 | QPSK + QPSK | CSI and 2 bit HARQ ACK/NACK |
| 3 | 48 | QPSK | Up to 10 bit HARQ ACK with/without 1 bit SR |
| 4 | M | E.g. QPSK | Scheduling request with implicit BS (buffer status) information |

FIG. 13A

| SR bit combination (using 4 bits) | Buffer status |
|---|---|
| 0000 | 0 < BS < 500 |
| 0001 | 500 < BS < 1000 |
| 0010 | 1000 < BS < 1500 |
| 0011 | 1500 < BS < 2000 |
| 0100 | 2000 < BS < 2500 |
| ... | ... |
| 1111 | 7500 < BS < 8000 |
| Configurable by RRC | |

FIG. 13B

| Code (or sequence) | Buffer status |
|---|---|
| Code 1 (or sequence 1) | 0 < BS < 500 |
| Code 2 (or sequence 2) | 500 < BS < 1000 |
| Code 3 (or sequence 3) | 1000 < BS < 1500 |
| Code 4 (or sequence 4) | 1500 < BS < 2000 |
| Code 5 (or sequence 5) | 2000 < BS < 2500 |
| ... | ... |
| Code M (or sequence M) | $X_{lower}$ < BS < $X_{upper}$ |
| Configurable by RRC | |

METHOD AND APPARATUS FOR SCHEDULING UPLINK DATA IN MOBILE COMMUNICATION SYSTEM

CROSS-REFERENCE TO RELATED APPLICATIONS

This application is a continuation of U.S. patent application Ser. No. 16/233,569 filed on Dec. 27, 2018, which is a continuation of U.S. patent application Ser. No. 15/674,452 filed on Aug. 10, 2017 now U.S. Pat. No. 10,172,153 issued on Jan. 1, 2019, which is based on and claims priority to Korean Patent Application No. 10-2016-0102597 filed on Aug. 11, 2016, Korean Patent Application No. 10-2017-0037144 filed on Mar. 23, 2017, and Korean Patent Application No. 10-2017-0092953 filed on Jul. 21, 2017, the disclosures of which are herein incorporated by reference in their entirety.

TECHNICAL FIELD

The present disclosure relates to a method and apparatus for transmitting and receiving uplink data between a user equipment and a base station in a mobile communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

When data to be sent to the base station occurs in a user equipment, the user equipment needs to be allocated resources necessary for data transmission from the base station. In this case, the user equipment may be allocated resources for data transmission by transmitting scheduling request (SR) information to the base station.

The resource used by the user equipment to transmit SR information may be configured in advance by the base station. For example, in the case of the LTE system, a user equipment can use a portion of the uplink control channel (PUCCH) region to send a scheduling request. Upon reception of a scheduling request from the user equipment, the base station may configure an uplink resource and notify the user equipment of the uplink resource.

Thereafter, the user equipment may transmit a buffer status report (BSR) to notify the base station of further data to be sent. However, the base station cannot know how much uplink data (in bytes) has been generated in the user equipment until it receives the BSR.

SUMMARY

To address the above-discussed deficiencies, it is a primary object to provide a method and apparatus that can reduce delay in uplink data transmission and reception between the user equipment and the base station in a mobile communication system.

In accordance with an aspect of the present disclosure, there is provided a method of uplink scheduling for a user equipment (UE) in a mobile communication system. The method may include: identifying the amount of data stored in a buffer; generating a scheduling request (SR); and transmitting the SR to a base station (NB) on the basis of the identified data amount so that an uplink resource is to be allocated from the NB.

Transmitting the SR may include: determining a transmission time for the SR according to the identified data amount; and transmitting the SR to the NB at the determined transmission time.

Transmitting the SR may include: determining the number of SR transmissions according to the identified data amount; and transmitting the SR to the NB according to the determined number of SR transmissions.

Transmitting the SR may include: determining the number of successive SR transmissions, and generating a bitmap for the number of successive SR transmissions; mapping the bitmap onto the identified data amount; and transmitting the SR to the NB according to the mapping result.

In one embodiment, the SR may be composed of multiple bits, and the multiple SR bits may be mapped to the identified data amount.

In one embodiment, the method may further include mapping the subframe index of a subframe where the SR can be generated onto a buffer status index indicating the status of the buffer, and the buffer status index may be set according to the amount of data stored in the buffer.

In one embodiment, the SR may be assigned to at least one of a first resource of a first transmission time interval (TTI) and a second resource of a second TTI within a subframe, and the first TTI may be longer than the second TTI.

In accordance with another aspect of the present disclosure, there is provided a method of uplink scheduling for a base station (NB) in a mobile communication system. The method may include: receiving a scheduling request (SR) from a user equipment (UE); identifying the amount of data stored in a buffer of the UE by use of the SR; and allocating an uplink resource to the UE on the basis of the identified data amount.

In a feature of the present disclosure, the method and apparatus for scheduling uplink data can reduce delay in uplink data transmission and reception between the user equipment and the base station Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a mapping between the buffer status index and uplink data according to Embodiment 1 of the present disclosure;

FIG. 8 illustrates a mapping between the number of SR transmissions and the uplink data size according to Embodiment 2-1 of the present disclosure;

FIG. 11 illustrates a mapping between the bitmap associated with SR transmission and the uplink data according to Embodiment 2-2 of the present disclosure;

FIG. 12 illustrates a method for uplink data transmission and reception according to Embodiment 3 of the present disclosure;

FIG. 13A illustrates a mapping between the multi-bit SR and the uplink data according to Embodiment 3-1 of the present disclosure;

FIG. 13B illustrates a mapping between the code-based SR and the uplink data according to Embodiment 3-2 of the present disclosure;

DETAILED DESCRIPTION

Figure 1:
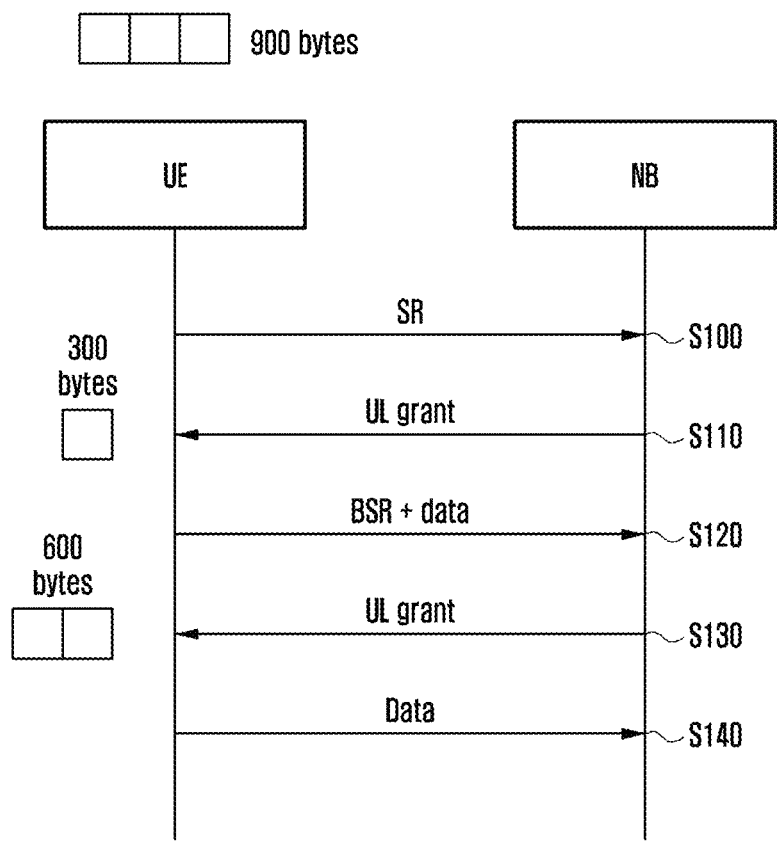
FIG. 1 illustrates a sequence diagram describing a first scheme for transmitting and receiving uplink data in a mobile communication system.

FIGS. 1 through 35, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to the accompanying drawings. The same or similar reference symbols are used throughout the drawings to refer to the same or like parts. Detailed descriptions of well-known functions and structures incorporated herein may be omitted to avoid obscuring the subject matter of the present disclosure.

Descriptions of functions and structures well known in the art and not directly related to the present disclosure may be omitted for clarity and conciseness, avoiding obscuring the subject matter of the present disclosure.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present disclosure will be more apparent from the following detailed description taken in conjunction with the accompanying drawings. The description of the various embodiments is to be construed as exemplary only and does not describe every possible instance of the present disclosure. It should be apparent to those skilled in the art that the following description of various embodiments of the present disclosure is provided for illustration purpose only and not for the purpose of limiting the present disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Next, embodiments of the present disclosure are described in detail with reference to the accompanying drawings. Detailed descriptions of related functions and structures incorporated herein may be omitted to avoid obscuring the subject matter of the present disclosure. Particular terms may be defined to describe the present disclosure in the best manner. Accordingly, the meaning of specific terms or words used in the specification and the claims should be construed in accordance with the spirit of the present disclosure.

In the following description, the term "base station" is a main agent allocating resources to user equipments and may refer to at least one of eNode B, Node B (NB), BS, radio access unit, base station controller, and network node. The term "user equipment (UE)" may refer to at least one of mobile station (MS), cellular phone, smartphone, computer, and multimedia system with a communication function. The term "downlink (DL)" refers to a wireless transmission path through which the base station sends a signal to the user equipment, and the term "uplink (UL)" refers to a wireless transmission path through which the user equipment sends a signal to the base station. The following description of embodiments is focused on the LTE or LTE-A system. However, the embodiments of the present disclosure are applicable to other communication systems having similar technical backgrounds and channel configurations.

FIG. 1 illustrates a sequence diagram describing a first scheme for transmitting and receiving uplink data in a mobile communication system.

The scheme of FIG. 1 is a procedure for uplink data transmission and reception between the user equipment (UE) and the base station (NB) in the LTE or 5G mobile communication system.

First, it is assumed that uplink data to be sent to the NB is generated in the UE. For example, the uplink data may be 900 bytes.

At step S100, the UE may transmit a scheduling request (SR) to the NB at an SR opportunity assigned to the UE.

At step S110, the NB may receive the SR sent by the UE and send an uplink grant to the UE in response to the SR, allocating an uplink resource to the UE.

Here, as the NB does not know how many bytes of uplink data have occurred to the UE, it may allocate an uplink resource corresponding to a given size. For example, the NB may allocate an uplink resource just enough to permit the UE to transmit a buffer status report (BSR).

In FIG. 1, it is assumed that the NB allocates an uplink resource for transmitting uplink data of 300 bytes.

At step S120, the UE may receive the uplink grant from the NB and send the uplink data to the NB through the allocated uplink resource.

In FIG. 1, although uplink data of 900 bytes is generated in the UE, as the NB allocates an uplink resource for sending 300-byte uplink data, the UE fails to transmit all of the generated uplink data (i.e., 900 bytes).

The UE may transmit a BSR to the NB at step S120 to notify the NB of the existence of 600-byte uplink data to be sent.

At step S130, the NB may receive the BSR and allocate additional resources to the UE on the basis of the information contained in the BSR (i.e. existence of 600-byte uplink data to be sent).

At step S140, the UE may receive the uplink grant from the NB and send the remaining uplink data of 600 bytes to the NB through the allocated resource.

Figure 2:
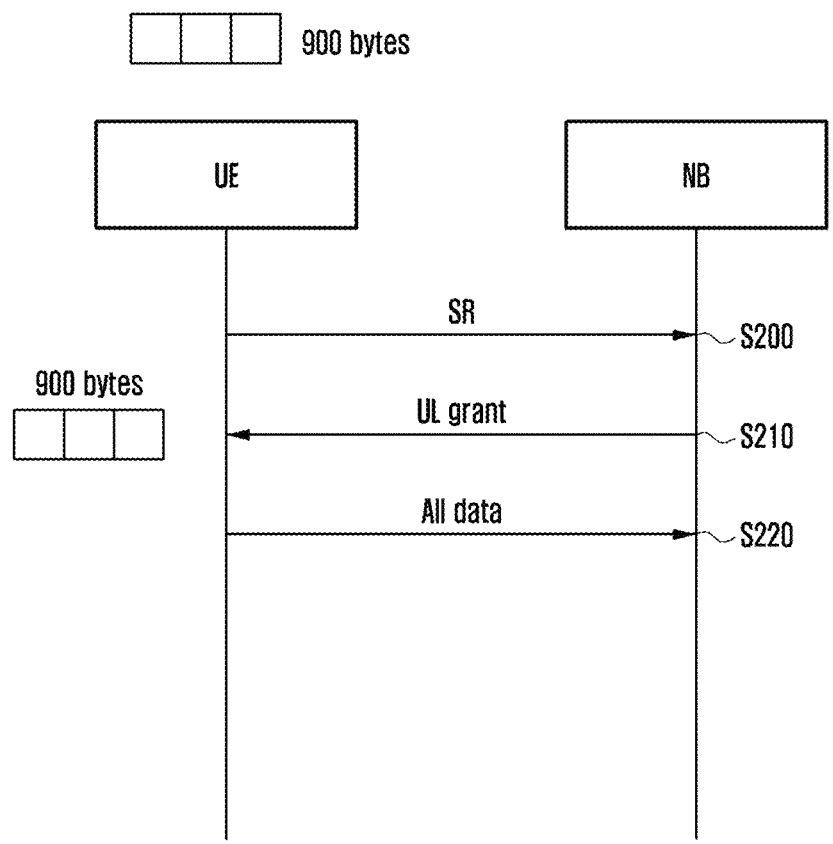
FIG. 2 illustrates a sequence diagram describing a second scheme for transmitting and receiving uplink data in a mobile communication system.

FIG. 2 illustrates a sequence diagram describing a second scheme for transmitting and receiving uplink data in a mobile communication system.

The scheme of FIG. 2 is a procedure for uplink data transmission and reception between the UE and the NB in the LTE or 5G mobile communication system.

First, it is assumed that uplink data to be sent to the NB is generated in the UE. For example, the uplink data may be 900 bytes.

At step S200, the UE may transmit an SR to the NB at an SR opportunity assigned to the UE.

At step S210, the NB may receive the SR sent by the UE and send an uplink grant to the UE in response to the SR, allocating an uplink resource to the UE.

Here, as the NB knows how many bytes of uplink data have occurred to the UE, it may allocate an uplink resource corresponding to the correct size of the uplink data to the UE. For example, the NB may allocate an uplink resource so as to permit transmission of uplink data of 900 bytes.

At step S220, the UE may receive the uplink grant from the NB and send the uplink data to the NB through the allocated uplink resource.

In FIG. 2, recognizing that uplink data of 900 bytes is generated in the UE, the NB allocates resources to the UE for transmitting 900-byte uplink data. Consequently, compared with the scheme of FIG. 1, the scheme of FIG. 2 may reduce the time required for uplink data transmission and reception.

TABLE 1

| Delay (subframe) | SR | Processing | UL grant | Processing | Data + BSR | Processing | UL grant | Processing | Data | Total |
|---|---|---|---|---|---|---|---|---|---|---|
| Scheme 1 | 1 | 3 | 1 | 3 | 1 | 3 | 1 | 3 | 1 | 17 |
| Scheme 2 | 1 | 3 | 1 | 3 | 1 | | | | | 9 |

In Table 1, Scheme 1 indicates the delay or latency associated with the scheme of FIG. 1 and Scheme 2 indicates the delay or latency associated with the scheme of FIG. 2.

Here, the time for the UE to wait for the assigned SR opportunity is excluded, and the processing time is assumed to be 3 subframes (subframe=TTI).

In the first scheme of FIG. 1, since the NB does not know the size of the uplink data to be transmitted by the UE, the uplink grant is transmitted twice, so that the total required time becomes 17 subframes.

That is, according to the operation of the first scheme, the NB cannot know how many bytes of uplink data are generated in the UE before receiving the BSR. Hence, uplink transmission and reception cannot be completed using the resource allocated through the first UL grant. In addition, it can be seen that delays occur owing to transmission and reception of the BSR, the second uplink grant, and the data.

In the second scheme of FIG. 2, since the NB knows the size of the uplink data to be transmitted by the UE, the uplink grant is transmitted once, so that the total required time becomes 9 subframes.

That is, if the size of uplink data generated in the UE is known, the NB can allocate a sufficient amount of resources to the UE to transmit all the uplink data through the first UL grant after reception of the SR from the UE. Hence, uplink transmission and reception between the UE and the NB can be completed before the BSR procedure is invoked.

The present disclosure proposes a method for reducing the delay of uplink transmission and reception. Particularly in the 5G mobile communication system, support of low-latency services is one of the important performance criteria. To this end, short TTI and non-orthogonal multiple access (NOMA) technologies are being investigated for the physical layer. These are key technologies for reducing latency from the viewpoint of transmission, but fail to consider the size of uplink data generated in the UE.

Additionally, for the UE providing a low-latency service, transmitting all the uplink data related to the low-latency service rapidly is more important than starting the initial transmission rapidly. As such, in the present disclosure, the NB is configured to approximatively identify the size of the uplink data generated in the UE without reception of the BSR from the UE. This may reduce the overall uplink transmission and reception delay by providing the possibility that the UE can transmit the NB all the generated uplink data at the first uplink transmission after the SR transmission.

The present disclosure proposes a method for improving the SR transmission and reception operation by enabling the NB to identify the size of uplink data generated in the UE without receiving a BSR from the UE.

The method proposed by the present disclosure is as follows.

Embodiment 1 of the present disclosure relates to a method for the NB to identify the size of uplink data generated in the UE on the basis of the SR transmission time without receiving a BSR from the UE.

Embodiment 2-1 of the present disclosure relates to a method for the NB to identify the size of uplink data generated in the UE on the basis of the number of SR transmissions without receiving a BSR from the UE.

Embodiment 2-2 of the present disclosure relates to a method for the NB to identify the size of uplink data generated in the UE on the basis of the interpretation of the number of SR transmissions without receiving a BSR from the UE.

Embodiment 3 of the present disclosure relates to a method for the NB to identify the size of uplink data generated in the UE on the basis of the multi-bit SR information without receiving a BSR from the UE.

The following assumptions are made in the present disclosure. This is for ease of description, and other assumptions can be applied on the same principle.

1. Each UE has an SR opportunity at every subframe. This may be viewed as a reasonable assumption for a UE using a low-latency service.

2. Each UE is in uplink synchronized state at the time when uplink data is generated, so that the UE does not have to perform a separate RACH procedure before the SR transmission.

Embodiment 1

FIGS. 3 to 6 are diagrams describing Embodiment 1 of the present disclosure. In Embodiment 1, a relationship is set up between the SR transmission time and the buffer status of the UE, and the UE may adjust the SR transmission time according to its buffer status.

Here, the term "buffer status (BS)" refers to the size of uplink data generated in the UE or the size of uplink data to be transmitted by the UE. The term is used in the LTE standard.

The UE and the NB may define a preliminary buffer status index (P-BSI) corresponding to the current subframe index. Here, the P-BSI can be represented by M levels through the modulo operation as shown in Equation 1 below.

$$\text{P-BSI subframe]}=(10*\text{SFN}+\text{subframe index}) \text{ modulo } (M) \qquad \text{[Equation 1]}$$

Figure 3:
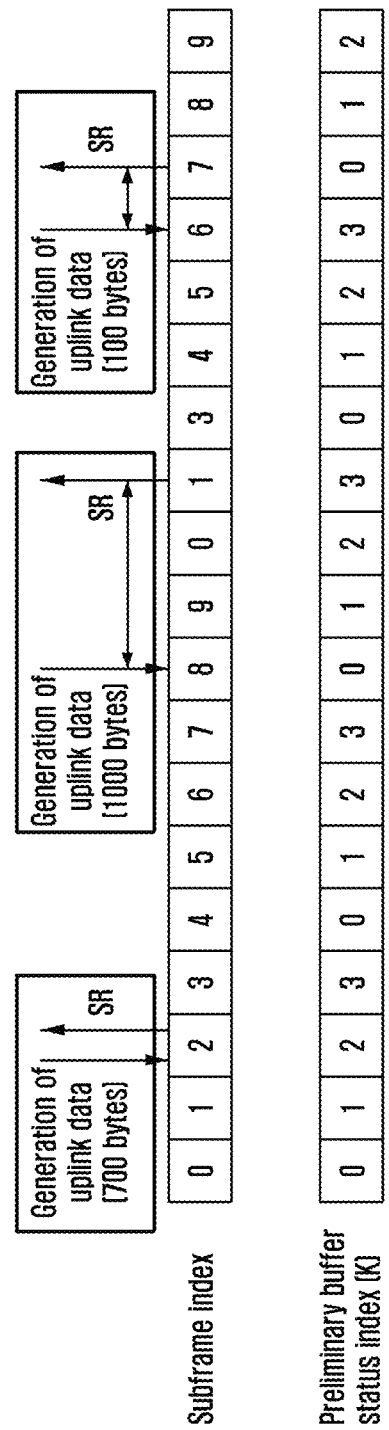
FIG. 3 illustrates uplink data transmission and reception according to Embodiment 1 of the present disclosure.

For example, the P-BSI can be represented by four levels (M=4) as shown in FIGS. 3 and 4.

The UE and the NB may set a buffer status corresponding to the P-BSI of a specific level (m).

FIG. 3 illustrates uplink data transmission and reception according to Embodiment 1 of the present disclosure.

As shown in FIG. 3, 10 subframe indexes (0~9) may be set for 10 subframes and 4 P-BSIs may be set in advance. Here, the relationship between the P-BSI and uplink data may be set in advance.

FIG. 4 illustrates a mapping between the buffer status index and uplink data according to Embodiment 1 of the present disclosure.

With reference to FIG. 4, when m=0, it means that 0 to 300 bytes of uplink data are in the buffer of the UE; when m=1, it means that 300 to 600 bytes of uplink data are in the buffer of the UE; when m=2, it means that 600 to 900 bytes of uplink data are in the buffer of the UE; and when m=3, it means that 900 to 1200 bytes of uplink data are in the buffer of the UE.

For example, with reference to FIGS. 3 and 4, when uplink data of 700 bytes is generated at third subframe (m=2), as third subframe (m=2) is mapped to third P-BSI (k=2), the UE may transmit an SR immediately at third subframe (m=2).

As another example, when uplink data of 1000 bytes is generated at ninth subframe (m=8), as ninth subframe (m=8) is mapped to first P-BSI (k=0), the UE does not transmit an SR at ninth subframe (m=8). Finding fourth P-BSI (k=3) corresponding to the uplink data of 1000 bytes, the UE may transmit an SR at second subframe (m=1) corresponding to fourth P-BSI (k=3).

As another example, when uplink data of 100 bytes is generated at seventh subframe (m=6), as seventh subframe (m=6) is mapped to fourth P-BSI (k=3), the UE does not transmit an SR at seventh subframe (m=6). Finding first P-BSI (k=0) corresponding to the uplink data of 100 bytes, the UE may transmit an SR at eighth subframe (m=7) corresponding to first P-BSI (k=0).

Figure 5:
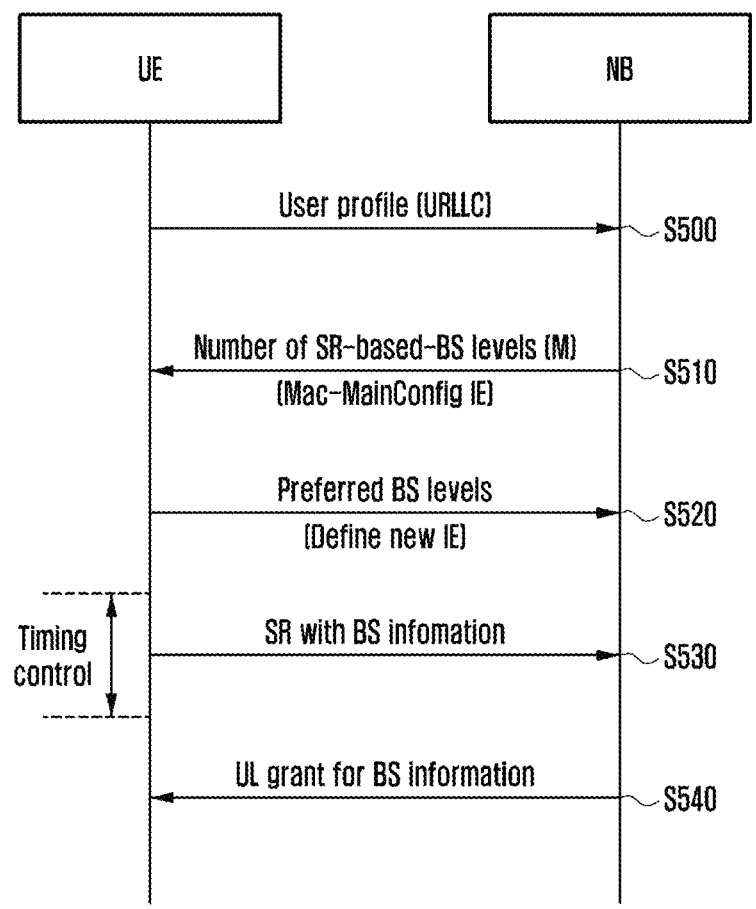
FIG. 5 illustrates a sequence diagram describing uplink resource allocation between the base station and the user equipment according to Embodiment 1 of the present disclosure.

FIG. 5 illustrates a sequence diagram describing uplink resource allocation between the NB and the UE according to Embodiment 1 of the present disclosure.

According to Embodiment 1, the UE and the NB may set the buffer status corresponding to the levels of the P-BSI.

At step S500, the UE may send profile information indicating support of a low-latency service to the NB. Alternatively, the UE may send a request for P-BSI configuration to the NB.

At step S510, the NB may notify the UE of the number of buffer status levels (i.e. P-BSI levels, M). Here, MAC-MainConfig IE of an RRC message may be used.

At step S520, the UE may notify the NB of the number of preferred buffer status levels (i.e. P-BSI levels, M). Here, a newly defined IE may be used.

At step S530, the UE may determine buffer status information corresponding to each P-BSI level and send an SR together with the buffer status information to the NB.

Here, the buffer status information corresponding to a P-BSI level may be represented as follows.

1. Lower Bound and Upper Bound for Buffer Status (e.g.) $m=1$: $X$lower_bound<buffer status<$X$upper_bound 2. Median and Range for Buffer Status (e.g.) $m=2$: median=$X$median and range=$R \rightarrow X$median-$R/2$<buffer status<$X$median+$R/2$ As such, the UE may determine the lower bound and upper bound or the median and range for the buffer status corresponding to each P-BSI level and report the determined information to the NB.

As an alternative to the buffer status information corresponding to each P-BSI level, the UE may report the index defined in Table 6.1.3.1-1 (buffer size levels for BSR) and Table 6.1.3.1-2 (extended buffer size levels for BSR) of the existing LTE MAC standard (TS 36.321).

At step S540, the NB may transmit the UE an uplink grant corresponding to the buffer status information sent by the UE. Upon reception of an SR from a UE having an agreed P-BSI configuration, the NB may check the P-BSI associated with the subframe at which the SR is received to identify the buffer status of the UE. Thereafter, the NB may perform uplink scheduling in consideration of the buffer status of the UE.

Although uplink scheduling in the NB is dependent on the implementation, to obtain the effect of the present disclosure, it is preferable that the scheduler of the NB allocates resources to the UE so that the UE can transmit all the uplink data through the first uplink grant.

Figure 6:
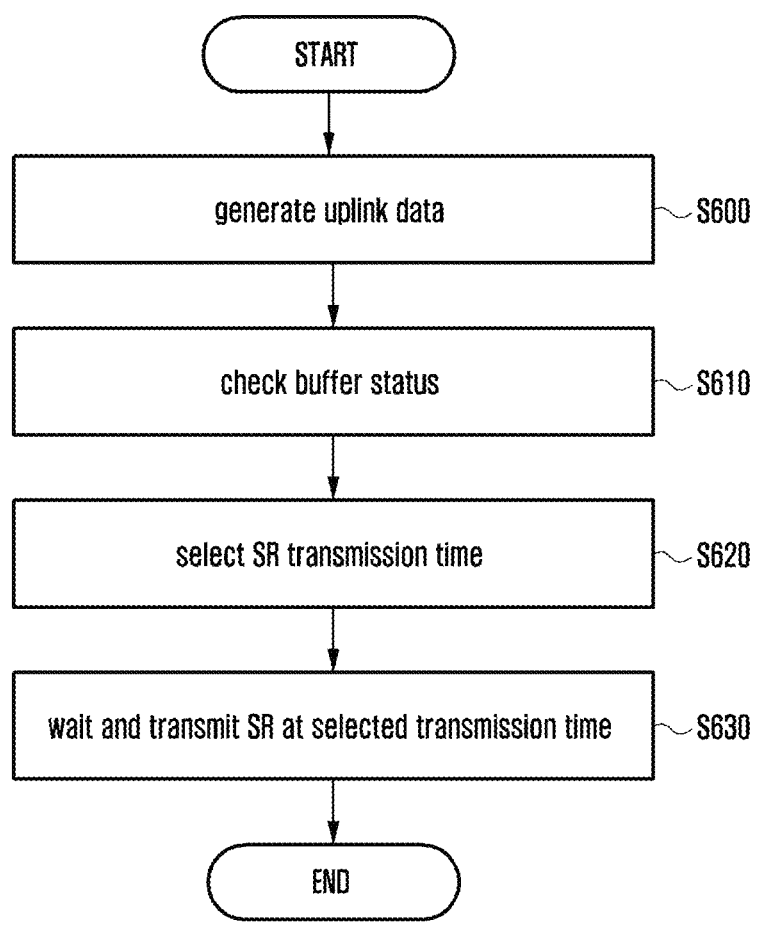
FIG. 6 illustrates a flowchart describing operations of the user equipment according to Embodiment 1 of the present disclosure.

FIG. 6 illustrates a flowchart describing UE operations according to Embodiment 1 of the present disclosure.

At step S600, uplink data to be sent to the NB is generated in the UE. At step S610, the UE examines its buffer status.

At step S620, the UE may identify the P-BSI associated with the buffer status and select a subframe corresponding to the identified P-BSI.

At step S630, the UE may wait until the selected subframe and transmit an SR at the selected subframe.

It can be seen that the total time required for Embodiment 1 is 9 to 12 subframes. This is because SR transmission may be delayed up to 4 subframes when four P-BSI levels are set. 9 to 12 subframes required for Embodiment 1 correspond to about a 30 to 47 percent reduction compared with 17 subframes required for the first scheme shown in Table 1.

In the above description of Embodiment 1, the P-BSI levels are depicted as being covered by the lower and upper limits of the buffer status. However, as the size of uplink data or traffic occurring in the UE is random, the corresponding P-BSI may not exist. For example, when the size of uplink data is 2000 bytes, the corresponding P-BSI does not exist. In such cases, the UE may operate as follows:

Regardless of the P-BSI assigned to each SR resource, the UE transmits an SR at the earliest SR resource from the time of the traffic occurrence.

The UE transmits an SR at an SR resource associated with the P-BSI that is most similar to (although not exactly matching) the size of the generated traffic.

In the proposed scheme, the UE transmits data and BSR to the NB through the uplink grant received after the SR transmission as in the conventional scheme. Here, the NB may identify the buffer status of the UE through the received BSR. Hence, even if there is no P-BSI corresponding to the size of traffic generated in the UE, the proposed scheme may work without any problem.

Embodiment 2-1

Figure 7:
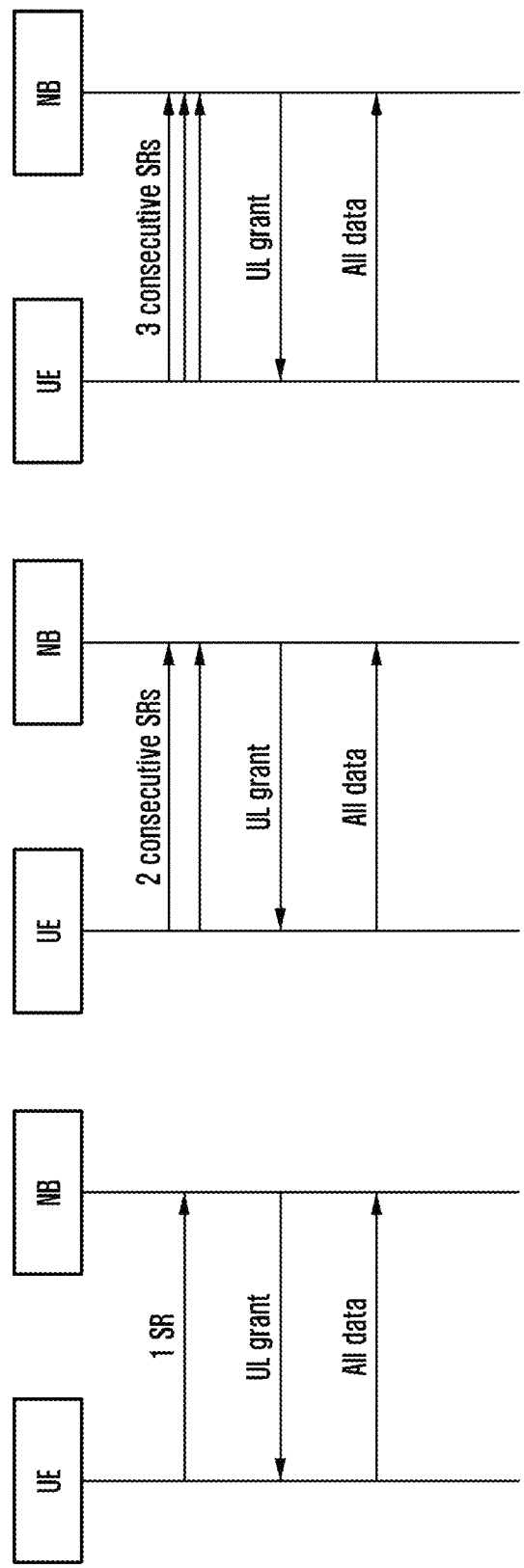
FIG. 7 illustrates a method for uplink data transmission and reception according to Embodiment 2-1 of the present disclosure.
Figure 9:
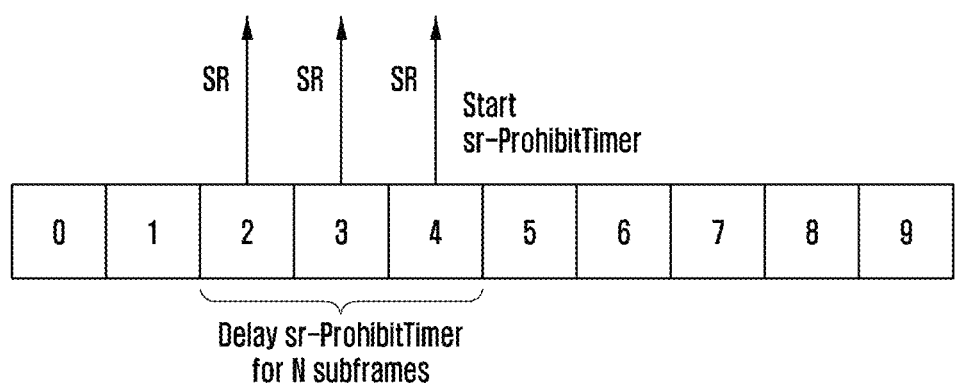
FIG. 9 illustrates configuration of a timer for prohibiting SR transmission according to Embodiment 2-1 of the present disclosure.

FIGS. 7 to 9 are diagrams describing Embodiment 2-1 of the present disclosure. In Embodiment 2-1, a relationship is set up between the number of successive SR transmissions and the buffer status of the UE, and the UE may adjust the number of successive SR transmissions according to its buffer status.

FIG. 7 illustrates a method for uplink data transmission and reception according to Embodiment 2-1 of the present disclosure.

The UE and NB may set the P-BSI corresponding to the number of successive SR transmissions (N) through RRC signaling. Here, the P-BSI is identical to that in Embodiment 1. That is, the P-BSI indicates the size range of uplink data to be transmitted by the UE.

FIG. 8 illustrates a mapping between the number of SR transmissions and the uplink data size according to Embodiment 2-1 of the present disclosure.

With reference to FIG. 8, when the number of successive SR transmissions is 1 (N=1), it means that 0 to 300 bytes of uplink data are in the buffer of the UE; when the number of successive SR transmissions is 2 (N=2), it means that 300 to 600 bytes of uplink data are in the buffer of the UE; and when the number of successive SR transmissions is 3 (N=3), it means that 600 to 900 bytes of uplink data are in the buffer of the UE.

With reference to FIGS. 7 and 8, the UE may transmit the SR once to the NB to notify the NB that uplink data of 0 to 300 bytes exists; the UE may transmit the SR twice to the NB to notify the NB that uplink data of 300 to 600 bytes exists; and the UE may transmit the SR three times to the NB to notify the NB that uplink data of 600 to 900 bytes exists.

The NB may identify the size of uplink data to be transmitted by the UE on the basis of the number of SR transmissions, and transmit the UE an uplink grant corresponding to the size of the uplink data. The UE may transmit the uplink data to the NB in response to the uplink grant.

Similarly to Embodiment 1, the UE and the NB may set the P-BSI corresponding to the number of successive SR transmissions through the procedure of FIG. 5. First, the NB provides the UE with information on the maximum number of successive SR transmissions.

When uplink data to be transmitted to the NB is generated, the UE operates as follows.

The UE may examine its buffer status and identify the P-BSI corresponding to the buffer status. The UE identifies the number of successive SR transmissions corresponding to the P-BSI and sends an SR from the current subframe as many times as the number of identified successive SR transmissions.

When the NB receives an SR from a UE having an agreed P-BSI configuration, it may identify the buffer status of the UE by checking how many times the SR has been successively received. Thereafter, the NB may perform uplink scheduling in consideration of the buffer status of the UE.

Although uplink scheduling in the NB is dependent on the implementation, to obtain the effect of the present disclosure, it is preferable that the scheduler of the NB allocates resources to the UE so that the UE can transmit all the uplink data through the first uplink grant.

FIG. 9 illustrates configuration of a timer for prohibiting SR transmission according to Embodiment 2-1 of the present disclosure.

To realize Embodiment 2-1 based on LTE, the LTE standard should allow successive SR transmissions of the UE. According to the current LTE standard, the sr-Prohibit-Timer starts when the UE transmits an SR, and the SR cannot be transmitted again until the timer expires.

Hence, in Embodiment 2-1, to allow successive SR transmissions of the UE, the start time of the sr-ProhibitTimer is to be changed as shown in FIG. 9.

The start time of the sr-ProhibitTimer=the time delayed by the maximum number of successive SR transmissions from the first SR transmission time As the maximum number of successive SR transmissions is set to 3 in FIGS. 7 and 8, when the first SR transmission is performed at subframe 2, the sr-ProhibitTimer starts from subframe 5, which is 3 subframes later from subframe 2.

Embodiment 2-2

Figure 10:
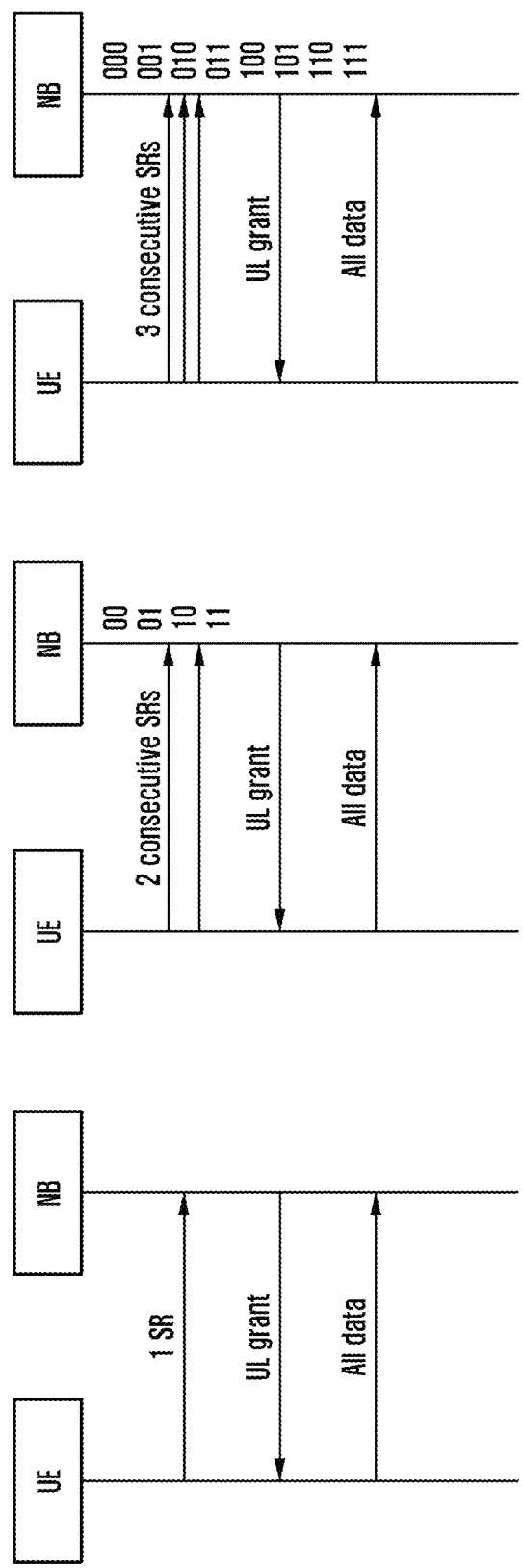
FIG. 10 illustrates a method for uplink data transmission and reception according to Embodiment 2-2 of the present disclosure.

FIGS. 10 and 11 are diagrams describing Embodiment 2-2 of the present disclosure. In Embodiment 2-2, a bitmap is created to represent a relationship between SR transmissions for a given interval and the buffer status of the UE, and the UE may adjust the SR transmission according to its buffer status.

FIG. 10 illustrates a method for uplink data transmission and reception according to Embodiment 2-2 of the present disclosure.

FIG. 10 illustrates formation of a bitmap representing SR transmissions for a given interval. If SR transmission is allowed for 2 subframes, a bitmap may be used to represent "00", "01", "10" and "11" according to the presence or absence of SR transmission. For example, if an SR is sent at the first subframe and an SR is not sent at the second subframe, a bitmap "10" may be used.

In addition, if SR transmission is allowed for 3 subframes, a bitmap may be used to represent "000", "001", "010", "011", "100", "101", "110", and "111". For example, if an SR is sent at the first subframe, an SR is not sent at the second subframe, and an SR is sent at the third subframe, a bitmap "101" may be used.

The UE and NB may set the P-BSI corresponding to the bitmap representing SR transmissions for a given interval through RRC signaling. Here, the P-BSI is identical to that in Embodiment 1. That is, the P-BSI indicates the size range of uplink data to be transmitted by the UE.

FIG. 11 illustrates a mapping between the bitmap associated with SR transmissions and the uplink data according to Embodiment 2-2 of the present disclosure. As shown in FIG. 11, it is possible to map the buffer status of the UE to bitmap values.

With reference to FIG. 11, when the bitmap associated with SR transmissions for 3 subframes is "100" (SR transmission on→off→off), it means that 1200 to 1500 bytes of uplink data are in the buffer of the UE.

Similarly to Embodiment 1, the UE and the NB may set the P-BSI corresponding to the bitmap associated with SR transmissions for a given interval through the procedure of FIG. 5. First, the NB provides the UE with information on the interval during which SR transmission is allowed.

When uplink data to be transmitted to the NB is generated, the UE operates as follows.

The UE may examine its buffer status and identify the P-BSI corresponding to the buffer status. The UE identifies the bitmap, associated with SR transmissions, corresponding to the P-BSI and sends an SR to the NB for the given interval according to the identified bitmap.

For example, when the buffer status is between 1200 and 1500 bytes, the UE may perform SR transmission for 3 consecutive subframes as indicated by the bitmap "100" (SR transmission at first subframe, no SR transmission at second subframe, and no SR transmission at third subframe (on-→off→off)).

When the NB receives an SR from a UE having an agreed P-BSI configuration, it may identify the buffer status of the UE by checking the bitmap indicated by the SR transmissions received during the given interval. Thereafter, the NB may perform uplink scheduling in consideration of the buffer status of the UE.

Although uplink scheduling in the NB is dependent on the implementation, to obtain the effect of the present disclosure, it is preferable that the scheduler of the NB allocates resources to the UE so that the UE can transmit all the uplink data through the first uplink grant.

Embodiment 3

FIGS. 12 and 13 are diagrams describing Embodiment 3 of the present disclosure. In Embodiment 3, a multi-bit SR signal is used for uplink transmission and reception.

FIG. 12 illustrates a method for uplink data transmission and reception according to Embodiment 3 of the present disclosure. As shown in FIG. 12, PUCCH format 4 allows use of a multi-bit SR indicating buffer status information.

In the current LTE system, on-off keying based signaling is applied to the SR signal. In contrast, the present disclosure proposes utilization of an SR signal composed of plural bits. Here, a relationship is set up between the SR bits and the buffer status of the UE, and the UE may transmit specific SR bits according to its buffer status. To this end, it is possible to use various codes or sequences. The present disclosure is not limited to utilization of SR bits, codes, or sequences.

The UE and NB may set the P-BSI corresponding to the SR bits through RRC signaling. Here, the P-BSI is identical to that in Embodiment 1. That is, the P-BSI indicates the size range of uplink data to be transmitted by the UE.

FIG. 13A illustrates a mapping between the multi-bit SR and the uplink data according to Embodiment 3-1 of the present disclosure.

With reference to FIG. 13A, when the SR bits are "0100", it means that 2000 to 2500 bytes of uplink data are in the buffer of the UE.

Similarly to Embodiment 1, the UE and the NB may set the P-BSI corresponding to the SR bits through the procedure of FIG. 5. First, the NB provides the UE with information on the number of bits constituting the SR signal.

When uplink data to be transmitted to the NB is generated, the UE operates as follows. The UE may examine its buffer status and identify the P-BSI corresponding to the buffer status. The UE may identify the SR bits corresponding to the P-BSI and transmit an SR signal composed of the SR bits.

For example, when uplink data to be sent is between 2000 and 2500 bytes, the UE may transmit SR bits "0100" as an SR signal.

In the present disclosure, various modulation schemes such as BPSK, QPSK and QAM may be applied to transmission of multi-bit SR signal. The present disclosure is not limited by the modulation and coding scheme applied to the SR signal.

When the NB receives an SR signal from a UE, it may identify the buffer status of the UE by checking the SR bits. Thereafter, the NB may perform uplink scheduling in consideration of the buffer status of the UE.

Addition 1

In the present disclosure, when a scheduling request signal is composed of plural bits, combinations of the bits are associated with the buffer status of the UE. Thus, when the NB receives the scheduling request signal, as the NB can identify not only the necessity of uplink transmission of the UE but also the buffer status information, the NB can rapidly allocate an uplink resource of a proper size to the UE. On the same principle, in the present disclosure, combinations of multiple bits constituting a scheduling request signal may correspond to various information as well as buffer status information. This includes the following examples:

I. The combination of multiple bits constituting a scheduling request signal may correspond to the type of traffic to be transmitted by the UE.
  a. Here, traffic types may include voice, video, text, FTP, and HTTP.
  b. When the NB receives a scheduling request signal corresponding to a specific traffic type from the UE, the NB may allocate time/frequency/space/numerology/TTI resources suitable for the UE to transmit the traffic.

II. The combination of multiple bits constituting a scheduling request signal may correspond to the type of a service or application generating uplink data to be sent by the UE.
  a. Here, service or application types may include SNS (social networking service), V2V (vehicle-to-vehicle), V2I (vehicle-to-infrastructure), V2P (vehicle-to-person), and news.
  b. When the NB receives a scheduling request signal corresponding to a specific service or application type from the UE, the NB may allocate time/frequency/space/numerology/TTI resources suitable for the UE to transmit data generated by the corresponding service or application.

III. The combination of multiple bits constituting a scheduling request signal may correspond to the logical channel to which the uplink data to be sent by the UE belongs.
  a. When the NB receives a scheduling request signal corresponding to a specific logical channel from the UE, the NB may allocate time/frequency/space/numerology/TTI resources suitable for the UE to transmit data generated in the logical channel.

IV. The combination of multiple bits constituting a scheduling request signal may correspond to the logical channel group to which the uplink data to be sent by the UE belongs.
  a. When the NB receives a scheduling request signal corresponding to a specific logical channel group from the UE, the NB may allocate time/frequency/space/numerology/TTI resources suitable for the UE to transmit data generated in the logical channel group.

V. The combination of multiple bits constituting a scheduling request signal may correspond to the network slice to which the uplink data to be sent by the UE belongs. Here, network slices may include the eMBB (enhanced mobile broadband) slice, URLLC (ultra-reliable and low-latency communication) slice, and mMTC (massive machine type communication) slice.
  a. When the NB receives a scheduling request signal corresponding to a specific network slice from the UE, the NB may allocate time/frequency/space/numerology/TTI resources suitable for the UE to transmit data generated in the network slice.

VI. The combination of multiple bits constituting a scheduling request signal may correspond to the numerology suitable for transmission and reception of the uplink data to be sent by the UE.
  a. Here, the numerology indicates the subcarrier spacing, and others. The subcarrier spacing may be represented by $15*2^m$ kHz (e.g., 15 kHz (m=0), 30 kHz (m=1), 60 kHz (m=2), 120 kHz (m=3)) or may be represented by $15*n$ kHz (e.g., 15 kHz (n=1), 30 kHz (n=2), 45 kHz (n=3), 60 kHz (n=4)). The numerology may indicate one of such values represented in various ways.
  b. When the NB receives a scheduling request signal corresponding to a specific numerology from the UE, the NB may allocate time/frequency/space resources corresponding to the numerology to the UE.

VII. The combination of multiple bits constituting a scheduling request signal may correspond to the TTI length suitable for transmission and reception of the uplink data to be sent by the UE.
  a. Here, the TTI length may indicate the length of a subframe, slot, mini-slot, or transmission interval of a control channel such as PDCCH. The TTI length may be represented by $½^m$ ms (e.g., 1 ms (m=0), 0.5 ms (m=1), 0.25 ms (m=2), 0.125 ms (m=3)). The TTI length may indicate one of such values represented in various ways.
  b. When the NB receives a scheduling request signal corresponding to a specific TTI length from the UE, the NB may allocate time/frequency/space resources corresponding to the TTI length to the UE.

VIII. The combination of multiple bits constituting a scheduling request signal may correspond to the latency requirement of the uplink data to be sent by the UE.
  a. Here, the latency requirement may be represented in units of time such as seconds, milliseconds, or subframes. The latency requirement may be given by (i) the maximum allowed time between when the UE transmits the scheduling request signal and when the uplink resource UE is allocated by the NB to the UE, or by (ii) the maximum allowed time between when the UE transmits the scheduling request signal and when the UE transmits uplink data.
  b. When the NB receives a scheduling request signal corresponding to a specific latency requirement from the UE, the NB may allocate time/frequency/space/numerology/TTI resources suitable for the UE to meet the latency requirement when transmitting the uplink data.

IX. The combination of multiple bits constituting a scheduling request signal may correspond to the QCI (QoS class identifier) of the uplink data to be sent by the UE.
  a. Here, the QCI may include QCIs defined in LTE as shown in the following table.

| CQI | Resource type | Priority | Packet delay budget | Packet error loss rate | Example services |
|---|---|---|---|---|---|
| 1 | GBR | 2 | 100 ms | $10^{-2}$ | Conversational voice |
| 2 | | 4 | 150 ms | $10^{-2}$ | Conversational video (live streaming) |
| 3 | | 3 | 50 ms | $10^{-2}$ | Real time gaming |
| 4 | | 5 | 300 ms | $10^{-2}$ | Non-conversational video (buffered streaming) |
| 5 | Non-GBR | 1 | 100 ms | $10^{-2}$ | IMS signaling |
| 6 | | 6 | 300 ms | $10^{-2}$ | Video (buffered streaming), TCP-based |
| 7 | | 7 | 100 ms | $10^{-2}$ | Voice, video interactive gaming |
| 8 | | 8 | 300 ms | $10^{-2}$ | Video (buffered streaming), TCP-based |
| 9 | | 9 | | | | b. When the NB receives a scheduling request signal corresponding to a specific QCI from the UE, the NB may allocate time/frequency/space/numerology/TTI resources suitable for the UE to meet the QCI.

X. The combination of multiple bits constituting a scheduling request signal may correspond to a combination of the above factors (i.e., buffer status, uplink traffic type, service or application type, logical channel, logical channel group, network slice, numerology, TTI length, latency requirement, QoS class identifier).

Addition 2

In the present disclosure, when a scheduling request signal is composed of plural bits, combinations of the bits are associated with the buffer status of the UE. Additionally, in <Addition 1>, combinations of plural bits constituting a scheduling request signal can correspond to various information. This extension may be applied to all the schemes proposed in the present disclosure.

Figure 13C:
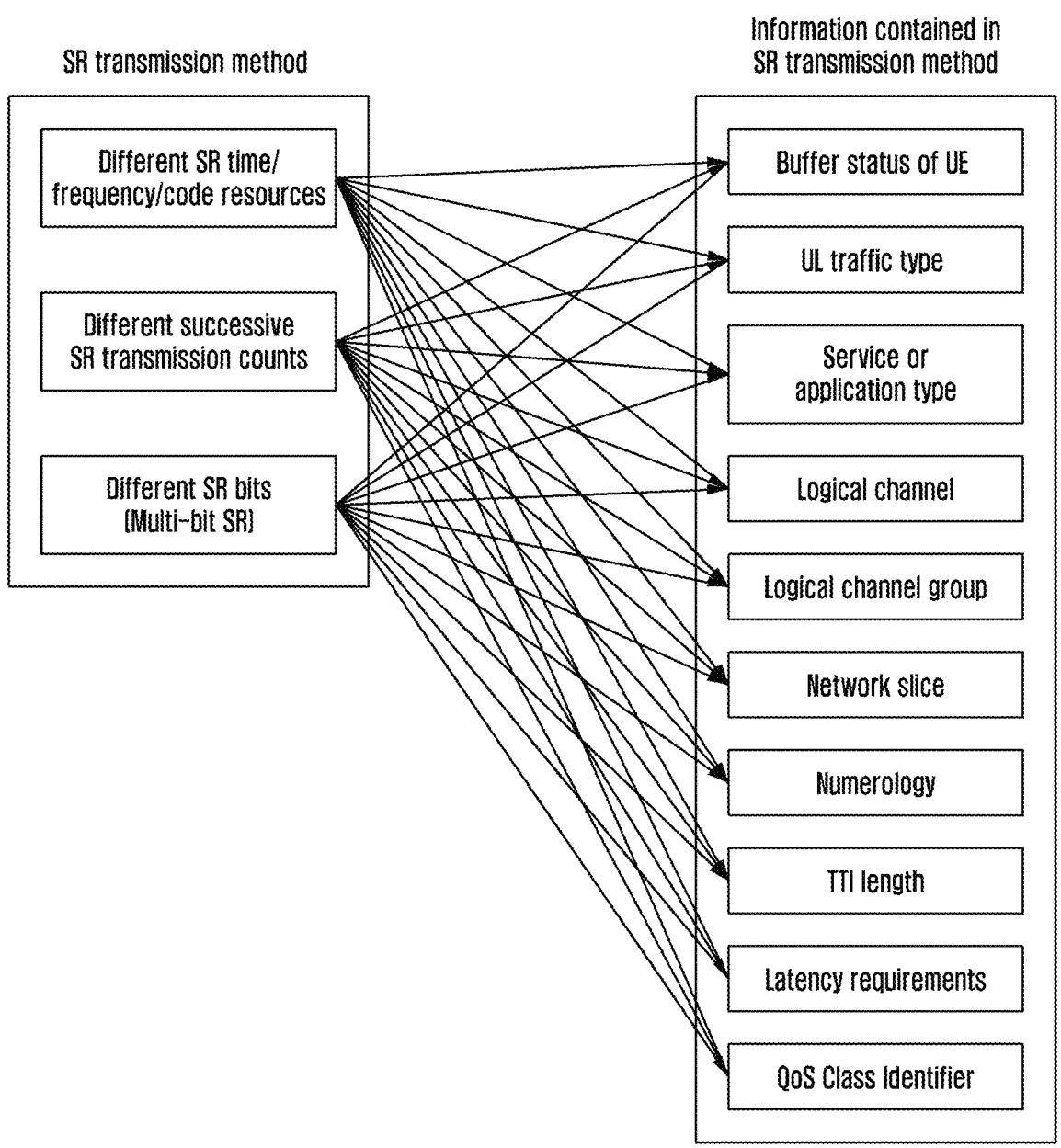
FIG. 13C illustrates a correspondence relationship between SR transmission schemes and information items carried thereby according to an embodiment of the present disclosure.

In addition to a scheme for using a scheduling request signal composed of multiple bits, the present disclosure has proposed (a) a scheme for transmitting the SR signal through different time, frequency, or code resources, and (b) a scheme for successively transmitting the SR signal. Hence, in the present disclosure, different time, frequency or code resources may correspond to the buffer status, uplink traffic type, service or application type, logical channel, logical channel group, network slice, numerology, TTI length, latency requirement, QoS class identifier, or a combination thereof. In addition, the number of successive SR transmissions may correspond to the buffer status, uplink traffic type, service or application type, logical channel, logical channel group, network slice, numerology, TTI length, latency requirement, QoS class identifier, or a combination thereof. This correspondence is shown in FIG. 13C.

Although uplink scheduling in the NB is dependent on the implementation, to obtain the effect of the present disclosure, it is preferable that the scheduler of the NB allocates resources to the UE so that the UE can transmit all the uplink data through the first uplink grant.

In the above description of the present disclosure, it is assumed that there is an SR resource allocated to the UE for every subframe. However, the present disclosure can be applied by assigning the P-BSI to each SR resource even if an SR resource is not allocated to the UE for each subframe.

FIG. 13B illustrates a mapping between the code-based SR and the uplink data according to Embodiment 3-2 of the present disclosure.

As shown in FIG. 13B, the UE can transmit a specific code according to its buffer status by use of the code-based SR. For example, when Code 2 is used as an SR, this indicates that uplink data of 500 to 1000 bytes is present in the buffer of the UE.

The UE and NB may set the P-BSI corresponding to the code-based SR through RRC signaling. Here, the P-BSI is identical to that in Embodiment 1. That is, the P-BSI indicates the size range of uplink data to be transmitted by the UE.

Similarly to Embodiment 1, the UE and the NB may set the P-BSI corresponding to each code through the following procedure.

The NB determines the number of SR-based BS levels and assigns a code to each BS level for the UE. The UE notifies the NB of the range of the buffer status corresponding to each BS level.

When uplink data to be transmitted to the NB is generated, the UE operates as follows. The UE may examine its buffer status and identify the P-BSI corresponding to the buffer status. The UE may identify the SR code corresponding to the P-BSI and transmit an SR signal composed of the identified code to the NB.

Upon reception of an SR code from a UE, the NB may identify the buffer status of the UE by checking the SR code. Thereafter, the NB may perform uplink scheduling in consideration of the buffer status of the UE.

Although uplink scheduling in the NB is dependent on the implementation, to obtain the effect of the present disclosure, it is preferable that the scheduler of the NB allocates resources to the UE so that the UE can transmit all the uplink data through the first uplink grant.

FIGS. 14 to 20 illustrate assignment of the buffer status index to SR resources according to embodiments of the present disclosure.

Figure 14:
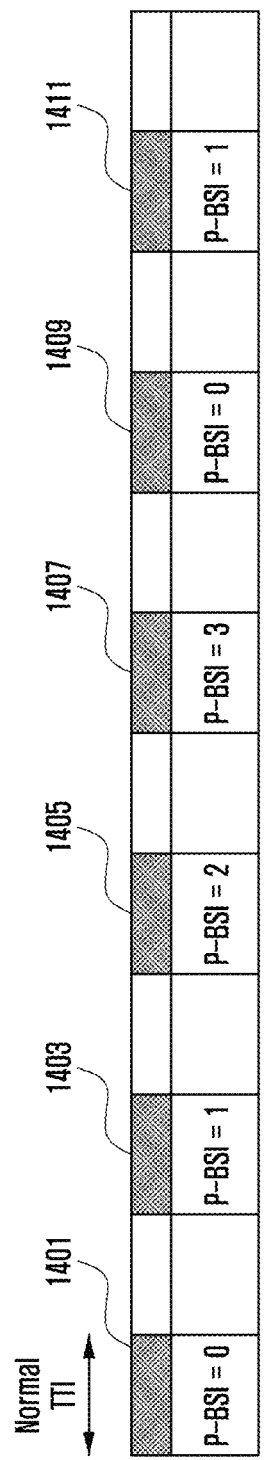
FIG. 14 illustrates assignment of the buffer status index to SR resources according to an embodiment of the present disclosure.

FIG. 14 illustrates assignment of the buffer status index to SR resources according to an embodiment of the present disclosure. Here, the buffer status index refers to the P-BSI described before.

In FIG. 14, an SR resource is allocated to the UE every two subframes. The P-BSI may be sequentially assigned to SR resources 1401 to 1411 allocated in the corresponding subframes.

Figure 15:
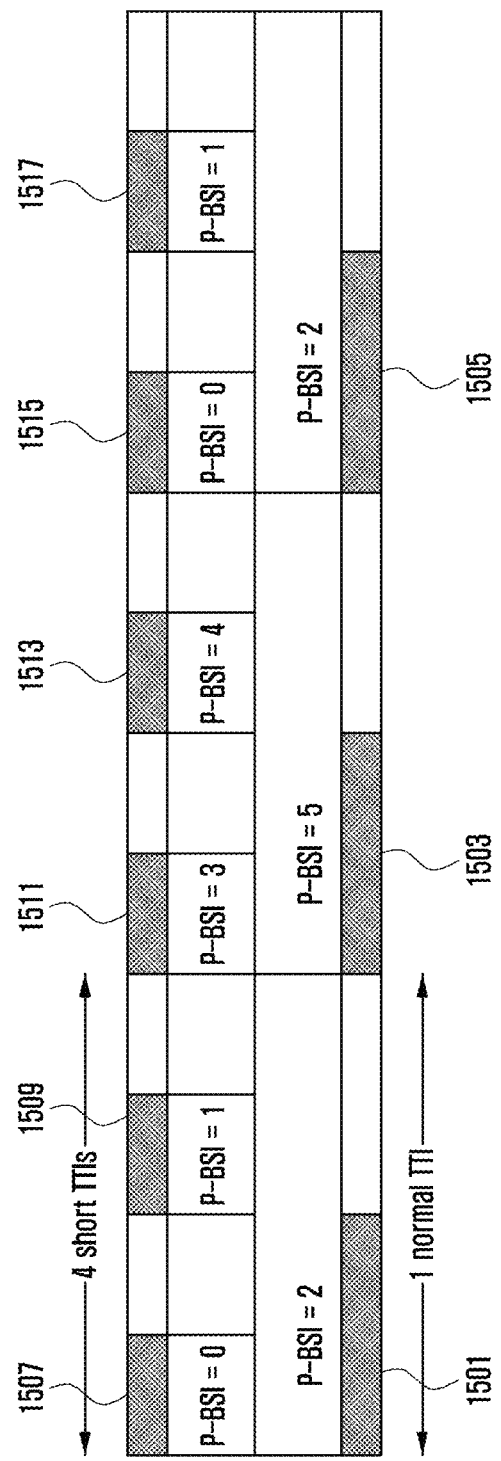
FIG. 15 illustrates assignment of the buffer status index to SR resources according to another embodiment of the present disclosure.

FIG. 15 illustrates assignment of the buffer status index to SR resources according to another embodiment of the present disclosure.

In FIG. 15, a normal TTI and short TTIs coexist in the same subframe, SR resources 1501 to 1505 are allocated every normal TTI, and SR resources 1507 to 1517 are allocated every 2 short TTIs. When the number of P-BSI levels is 6, within one subframe, the P-BSI may be first assigned to SR resources (e.g., 1507, 1509) of the short TTI and then assigned to an SR resource (e.g., 1501) of the normal TTI.

Figure 16:
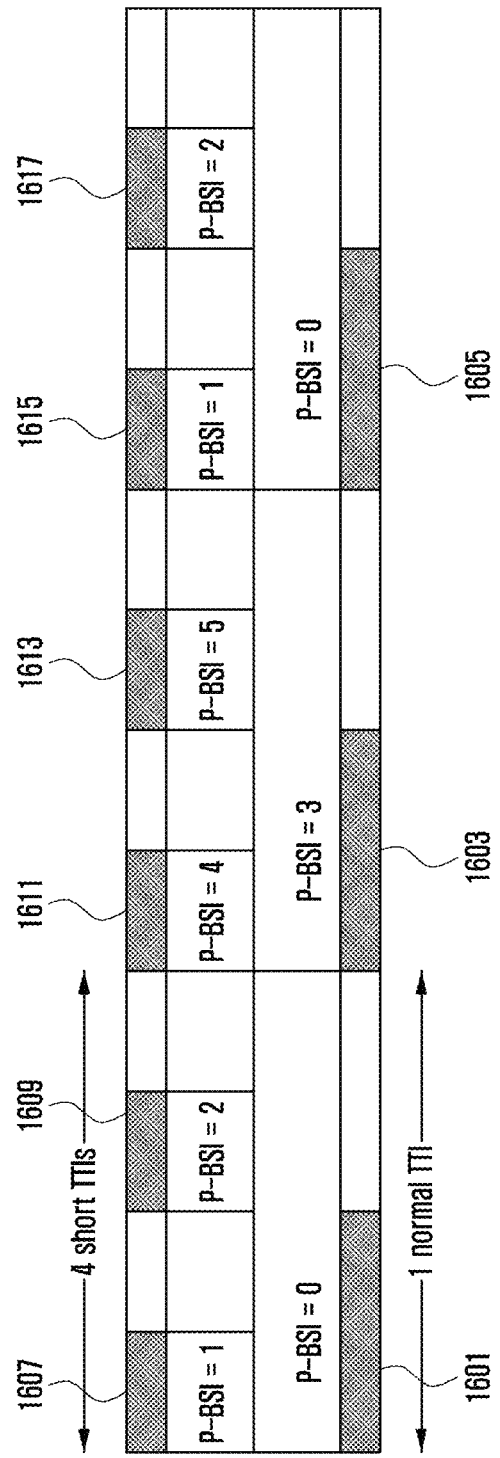
FIG. 16 illustrates assignment of the buffer status index to SR resources according to another embodiment of the present disclosure.

FIG. 16 illustrates assignment of the buffer status index to SR resources according to another embodiment of the present disclosure.

In FIG. 16, a normal TTI and short TTIs coexist in the same subframe, SR resources 1601 to 1605 are allocated every normal TTI, and SR resources 1607 to 1617 are allocated every 2 short TTIs. When the number of P-BSI levels is 6, within one subframe, the P-BSI may be first assigned to an SR resource (e.g., 1601) of the normal TTI and then assigned to SR resources (e.g., 1607, 1609) of the short TTI.

Figure 17:
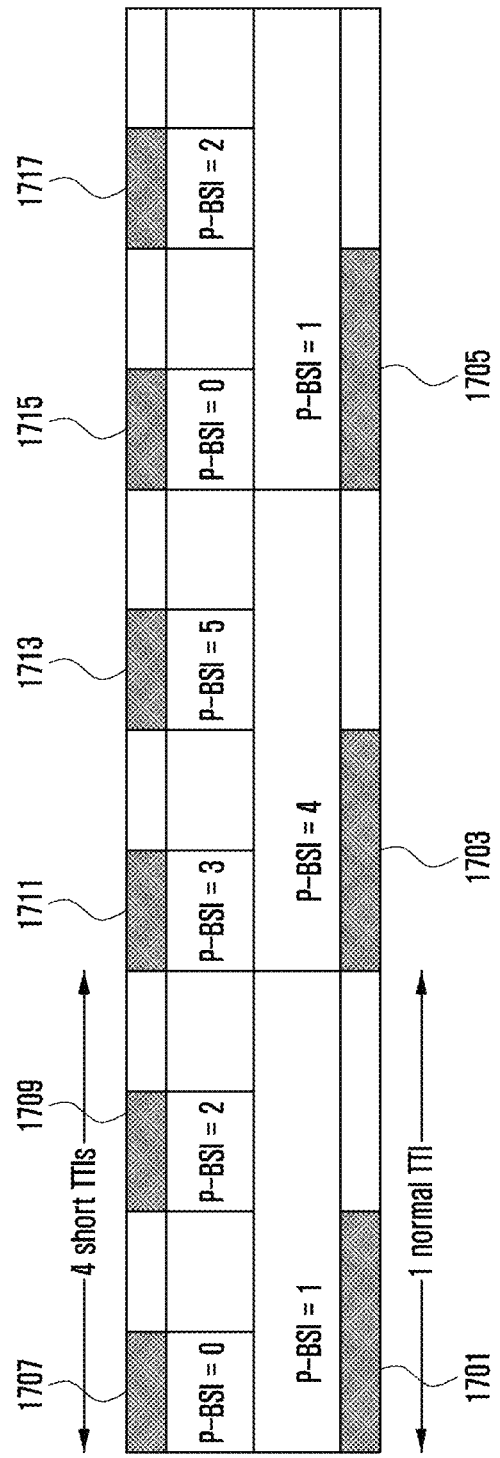
FIG. 17 illustrates assignment of the buffer status index to SR resources according to another embodiment of the present disclosure.

FIG. 17 illustrates assignment of the buffer status index to SR resources according to another embodiment of the present disclosure.

In FIG. 17, a normal TTI and short TTIs coexist in the same subframe, SR resources 1701 to 1705 are allocated every normal TTI, and SR resources 1707 to 1717 are allocated every 2 short TTIs.

When the number of P-BSI levels is 6, the P-BSI may be first assigned to an SR resource (e.g., 1707) of the short TTI and then assigned to an SR resource (e.g., 1701) of the normal TTI in a first-come-first-served manner within one subframe.

Figure 18:
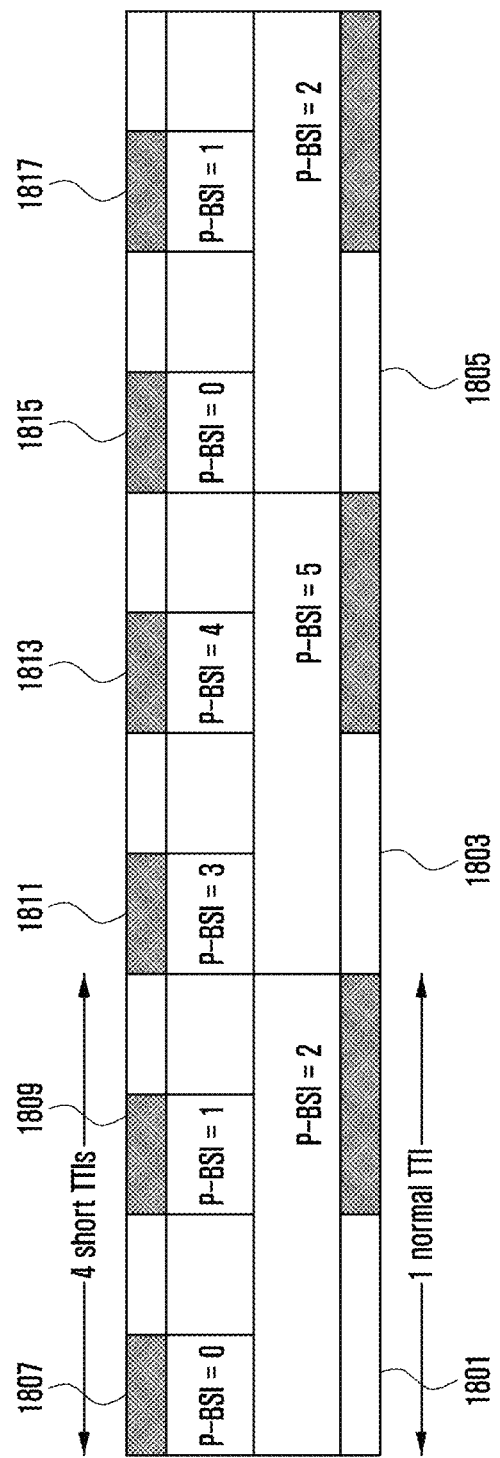
FIG. 18 illustrates assignment of the buffer status index to SR resources according to another embodiment of the present disclosure.

FIG. 18 illustrates assignment of the buffer status index to SR resources according to another embodiment of the present disclosure.

In FIG. 18, a normal TTI and short TTIs coexist in the same subframe, SR resources 1801 to 1805 are allocated every normal TTI, and SR resources 1807 to 1817 are allocated every 2 short TTIs.

When the number of P-BSI levels is 6, the P-BSI may be first assigned to an SR resource coming earlier in time (e.g., SR resource 1807 or 1809) and then assigned to an SR resource coming later in time (e.g., SR resource 1801) within one subframe.

Figure 19:
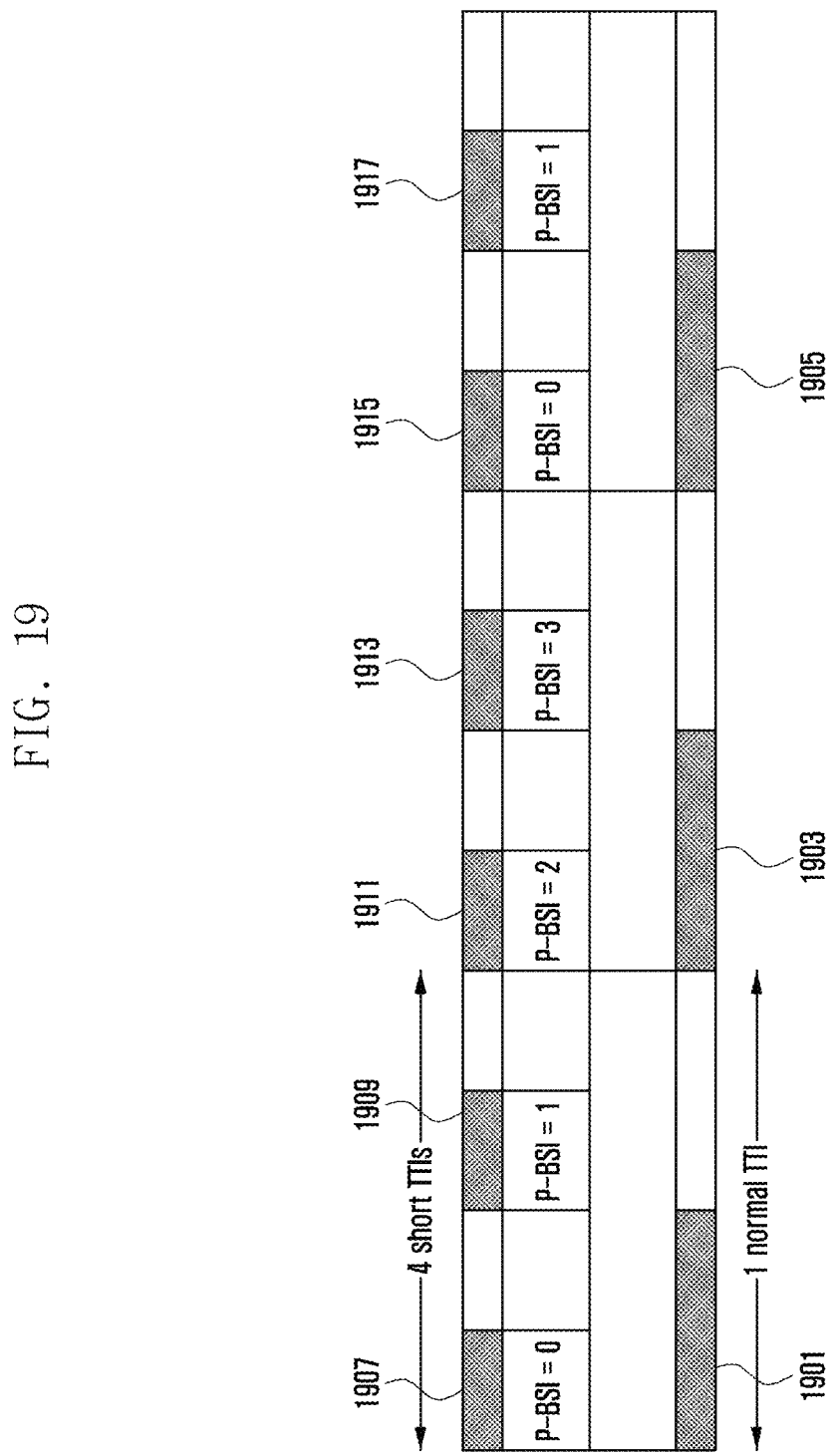
FIG. 19 illustrates assignment of the buffer status index to SR resources according to another embodiment of the present disclosure.

FIG. 19 illustrates assignment of the buffer status index to SR resources according to another embodiment of the present disclosure.

In FIG. 19, a normal TTI and short TTIs coexist in the same subframe, SR resources 1901 to 1905 are allocated every normal TTI, and SR resources 1907 to 1917 are allocated every 2 short TTIs. When the number of P-BSI levels is 4, the P-BSI may be assigned to SR resources (e.g., 1907, 1909) of the short TTI and may be not assigned to an SR resource (e.g., 1901) of the normal TTI.

Figure 20:
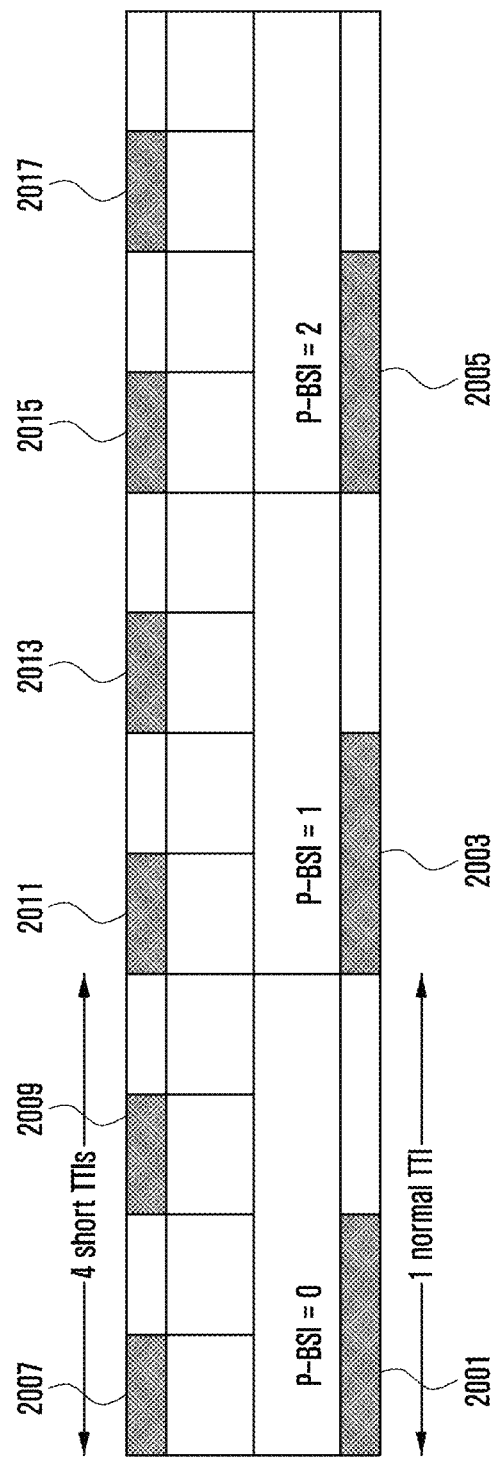
FIG. 20 illustrates assignment of the buffer status index to SR resources according to another embodiment of the present disclosure.

FIG. 20 illustrates assignment of the buffer status index to SR resources according to another embodiment of the present disclosure.

In FIG. 20, a normal TTI and short TTIs coexist in the same subframe, SR resources 2001 to 2005 are allocated every normal TTI, and SR resources 2007 to 2017 are allocated every 2 short TTIs. When the number of P-BSI levels is 4, the P-BSI may be assigned to SR resources (e.g., 2001) of the normal TTI and may be not assigned to an SR resource (e.g., 2007, 2009) of the short TTI.

With reference to FIGS. 14 to 20, a description is given of various examples of the rule for assigning the P-BSI when normal and short TTIs coexist. This may be summarized as follows:

<When Only One TTI Type is Used>

The P-BSI is sequentially assigned to SR resources in the order of allocation.

<When Normal and Short TTIs Coexist>

Rule 1: within one subframe (or one normal TTI), the P-BSI is first assigned to SR resources of the short TTI in sequence and then assigned to SR resources of the normal TTI in sequence.

Rule 2: within one subframe (or one normal TTI), the P-BSI is first assigned to SR resources of the normal TTI in sequence and then assigned to SR resources of the short TTI in sequence.

Rule 3: within one subframe (or one normal TTI), the P-BSI is sequentially assigned to SR resources in the order of allocation. If an SR resource of the short TTI and an SR resource of the normal TTI appear at the same time, the P-BSI is assigned first to the SR resource of the short TTI.

Rule 4: within one subframe (or one normal TTI), the P-BSI is sequentially assigned to SR resources in the order of allocation. If an SR resource of the short TTI and an SR resource of the normal TTI appear at the same time, the P-BSI is assigned first to the SR resource of the normal TTI.

Rule 5: the P-BSI is sequentially assigned only to SR resources of the short TTI in the order of allocation.

Rule 6: the P-BSI is sequentially assigned only to SR resources of the normal TTI in the order of allocation.

In the present disclosure, the NB and the UE share the above rule. The NB may notify the UE of the rule index according to the currently used frame structure and SR resources allocated to the UE through RRC signaling (e.g. RRCConnectionReconfiguration message). Here, the NB and the UE may know the contents of the rule corresponding to the index in advance through preset standards or the like.

Embodiment 4

Figure 21:
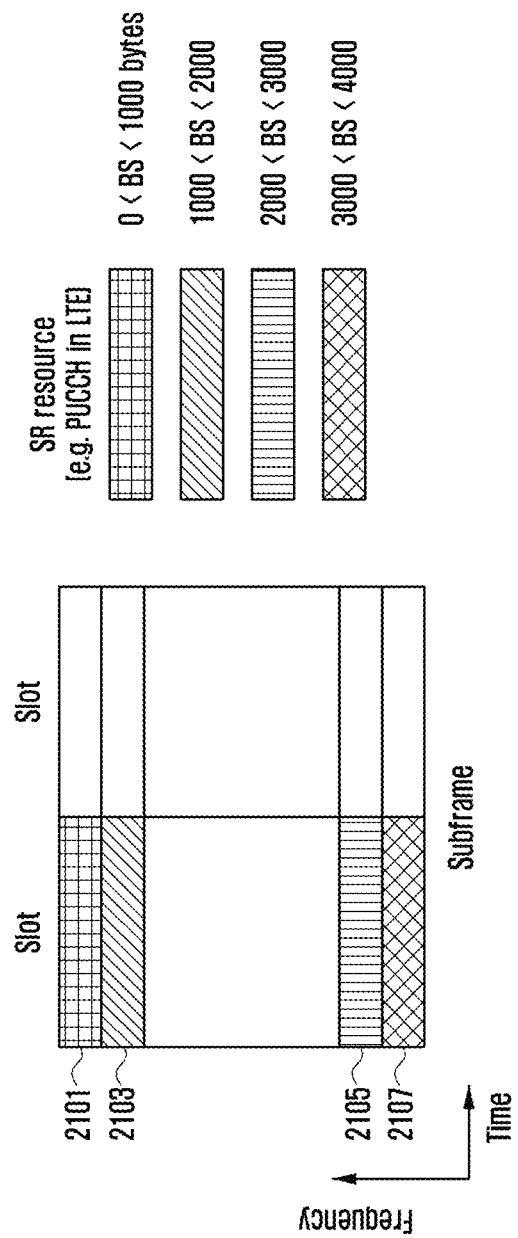
FIG. 21 illustrates a method for uplink data transmission and reception according to Embodiment 4-1 of the present disclosure.
Figure 22:
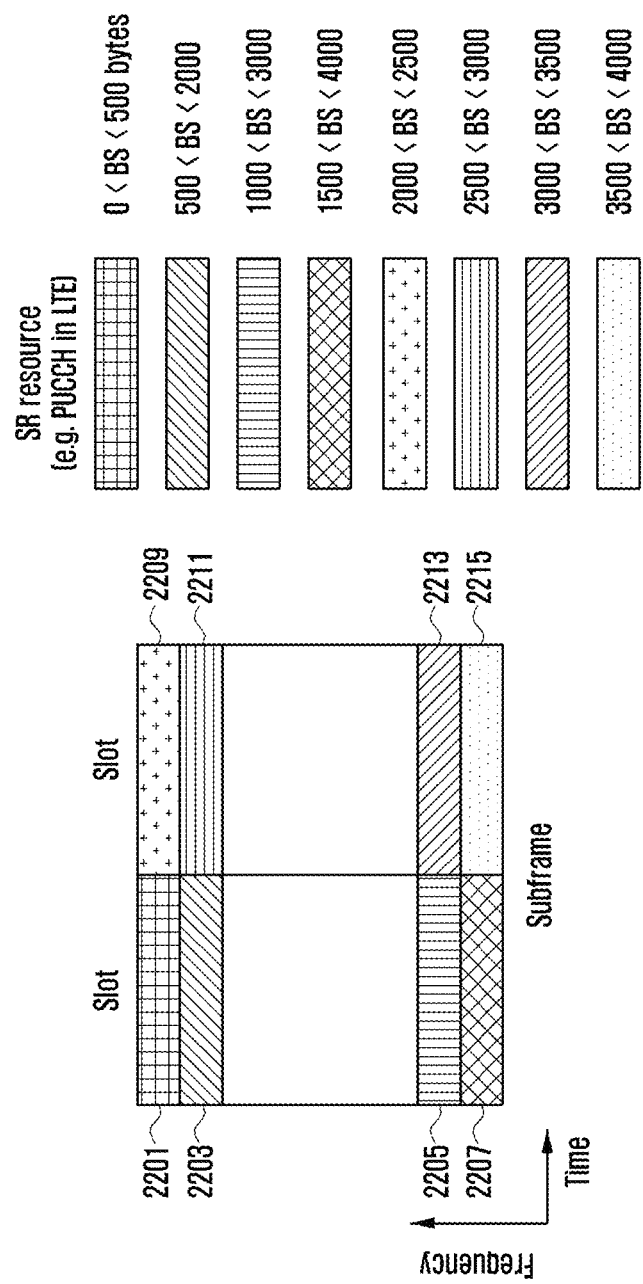
FIG. 22 illustrates a method for uplink data transmission and reception according to Embodiment 4-2 of the present disclosure.

FIGS. 21 and 22 are diagrams describing Embodiment 4 of the present disclosure.

In the above description of the present disclosure, a relationship is set up between the SR transmission time and the P-BSI in the time domain, and the UE may adjust the SR transmission time according to its buffer status. On the same principle, in the present disclosure, when there are multiple SR resources allocated to the UE in the frequency domain, a relationship is set up between SR resources with an identical allocation time and different frequencies and the P-BSI, and the UE may select an SR transmission resource according to its buffer status.

FIG. 21 illustrates a method for uplink data transmission and reception according to Embodiment 4-1 of the present disclosure.

As shown in FIG. 21, the UE may be allocated 4 SR resources with an identical time and different frequencies within one subframe. Each SR resource may correspond to one of P-BSI levels indicating the BS (buffer status) of 0 to 1000 bytes, the BS of 1000 to 2000 bytes, the BS of 2000 to 3000 bytes, and the BS of 3000 to 4000 bytes, respectively.

When uplink data of 2500 bytes is generated, the UE may transmit an SR through the third SR resource 2105 among the four SR resources 2101 to 2107. When the NB receives an SR from the UE through the third SR resource 2105, the NB may identify the buffer status of the UE and perform uplink scheduling in consideration of the buffer status.

Here, similarly to Embodiment 1 of FIG. 5, the UE and the NB may set the P-BSI corresponding to individual SR resources. In this case, the NB may notify the UE of information on the total number of SR resources allocated in the frequency domain.

FIG. 22 illustrates a method for uplink data transmission and reception according to Embodiment 4-2 of the present disclosure.

On the same principle, in the present disclosure, when there are multiple SR resources allocated to the UE in the time domain and the frequency domain, a relationship is set up between SR resources with different times and frequencies and the P-BSI, and the UE may select an SR transmission resource according to its buffer status.

As shown in FIG. 22, the UE may be allocated 8 SR resources with different times and frequencies within one subframe. Each SR resource 2201 to 2215 may correspond to one of P-BSI levels indicating the BS of 0 to 500 bytes, the BS of 500 to 1000 bytes, the BS of 1000 to 1500 bytes, the BS of 1500 to 2000 bytes, the BS of 2000 to 2500 bytes, the BS of 2500 to 3000 bytes, the BS of 3000 to 3500 bytes, and the BS of 3500 to 4000 bytes, respectively.

When uplink data of 3300 bytes is generated, the UE may transmit an SR through the seventh SR resource 2213 among the eight SR resources 2201 to 2215. When the NB receives an SR from the UE through the seventh SR resource 2213, the NB may identify the buffer status of the UE and perform uplink scheduling in consideration of the buffer status.

Here, similarly to Embodiment 1 of FIG. 5, the UE and the NB may set the P-BSI corresponding to individual SR resources. In this case, the NB may notify the UE of information on the total number of SR resources allocated in the time domain and the frequency domain.

Embodiment 5

FIGS. 23 to 27 are diagrams describing Embodiment 5 of the present disclosure.

In the present disclosure, the UE transmits an SR to the NB, receives an uplink grant from the NB, and transmits BSR or data to the NB through an allocated UL resource. However, since non-orthogonal multiple access (NOMA) technologies (power domain, code domain, and other NOMA domain) have been actively investigated recently, the UE may transmit BSR or data to the NB without SR transmission.

Figure 23:
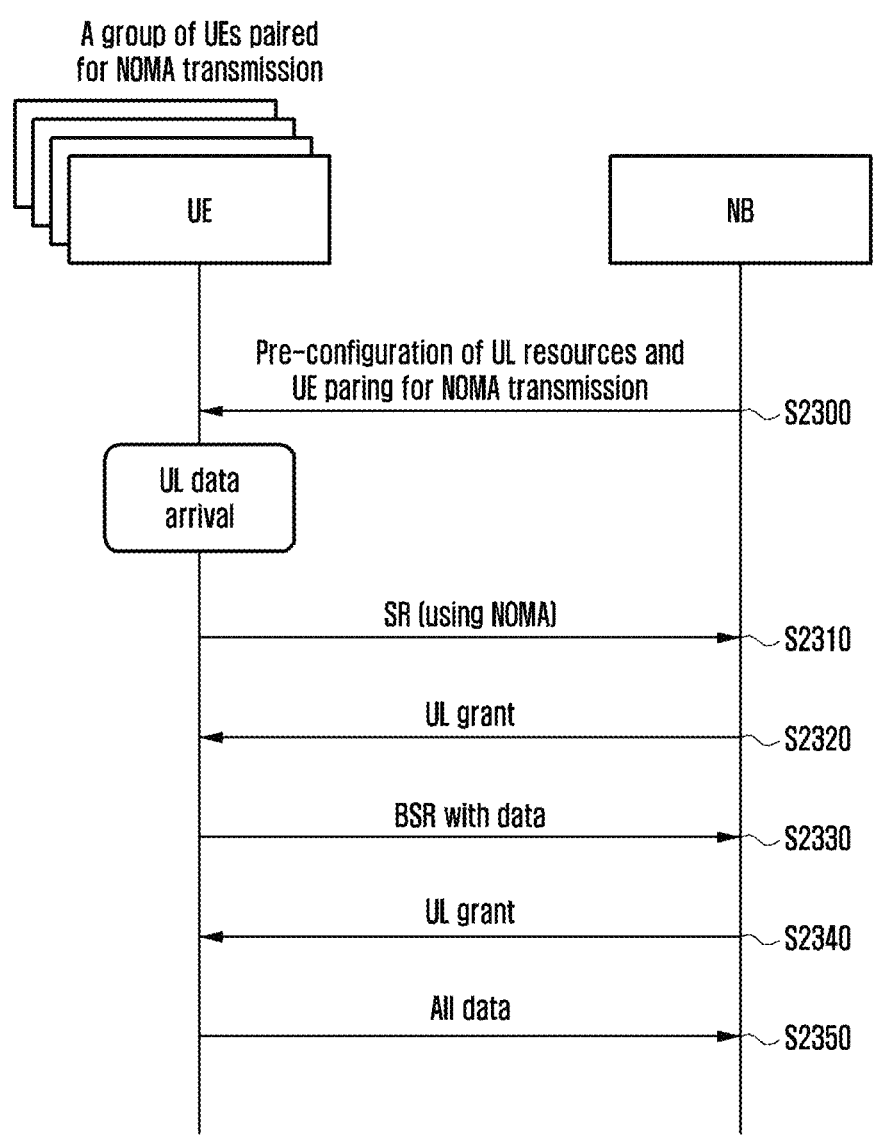
FIG. 23 illustrates a sequence diagram depicting a method for uplink data transmission and reception according to Embodiment 5-1 of the present disclosure.

FIG. 23 illustrates a sequence diagram depicting a method for uplink data transmission and reception according to Embodiment 5-1 of the present disclosure. In Embodiment 5-1, the UE transmits an SR using NOMA and receives an uplink grant.

In FIG. 23, without dedicatedly allocating an SR resource to each UE, multiple UEs (a group of UEs paired or unpaired in advance by the NB) send an SR signal through a common resource. The dedicated allocation of an SR resource to each UE may be viewed as overhead in terms of resource utilization. Hence, transmission of an SR resource based on NOMA can reduce such overhead.

Figure 24:
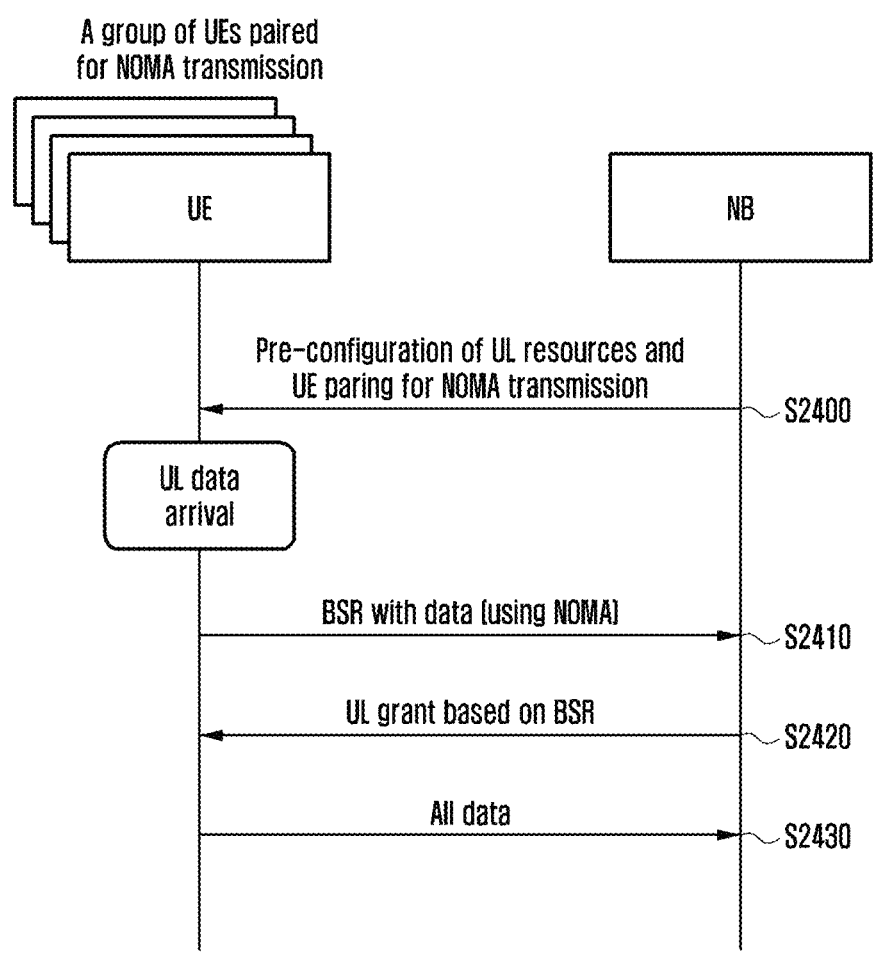
FIG. 24 illustrates a sequence diagram depicting a method for uplink data transmission and reception according to Embodiment 5-2 of the present disclosure.

FIG. 24 illustrates a sequence diagram depicting a method for uplink data transmission and reception according to Embodiment 5-2 of the present disclosure. In Embodiment 5-2, the UE transmits a BSR using NOMA and receives an uplink grant.

Figure 25:
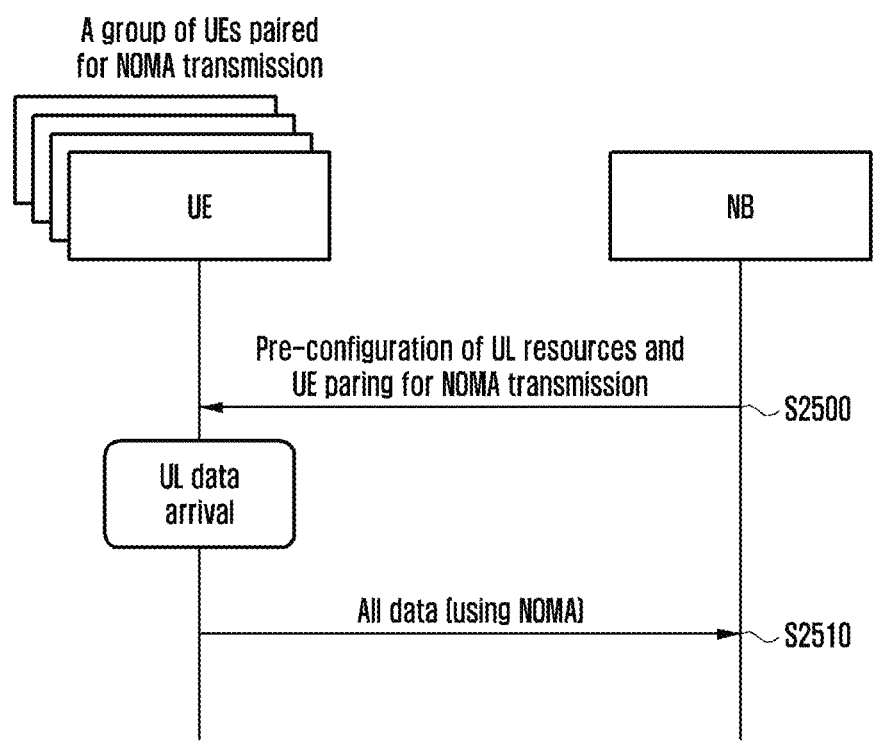
FIG. 25 illustrates a sequence diagram depicting a method for uplink data transmission and reception according to Embodiment 5-3 of the present disclosure.

FIG. 25 illustrates a sequence diagram depicting a method for uplink data transmission and reception according to Embodiment 5-3 of the present disclosure. In Embodiment 5-2, the UE transmits all data using NOMA.

For this operation, the NB pairs one or more UEs. When the paired UEs transmit signals through the same time and frequency resource, the NB applies successive interference cancellation (SIC) in the code domain, power domain, or other domain to separate signals transmitted from the paired UEs before decoding. However, there may be cases where UE pairing is not required according to NOMA technologies.

With NOMA technology, uplink data can be transmitted without SR and uplink grant procedures. If the size of uplink data to be transmitted is too large to transmit in the resource allocated for the first NOMA transmission, the UE sends a portion of the uplink data and a BSR to the NB through NOMA transmission. Then, on the basis of the buffer status information of the UE included in the BSR, the NB may allocate a sufficient amount of resources to the UE so that the UE can rapidly complete the uplink transmission.

Figure 26:
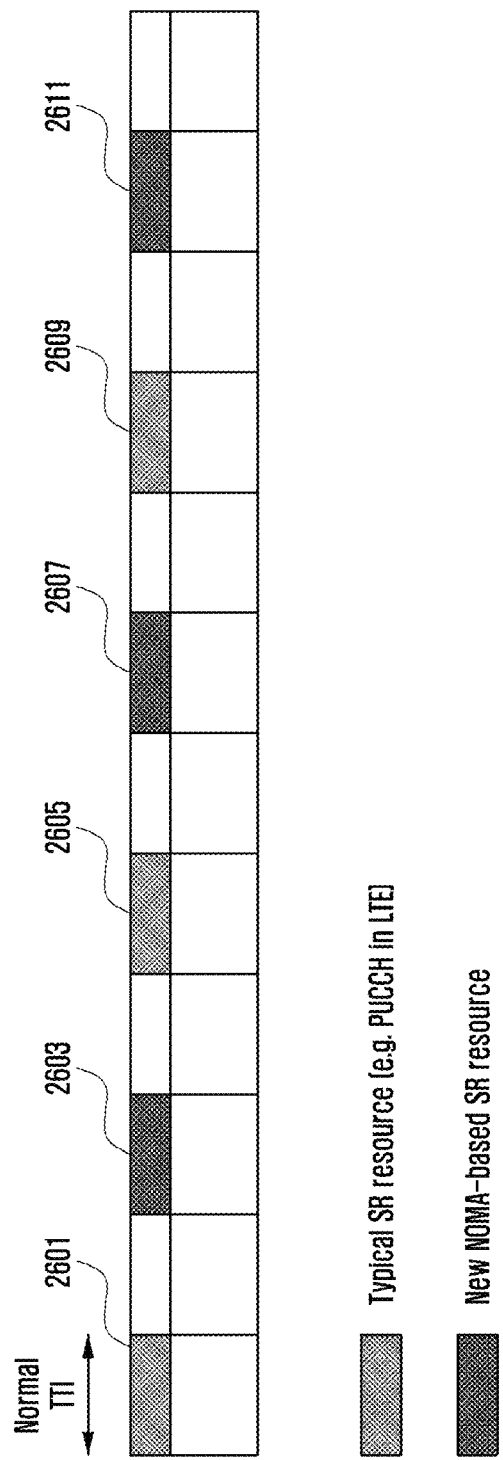
FIG. 26 illustrates coexistence between SR resources and NOMA-based SR resources according to an embodiment of the present disclosure.
Figure 27:
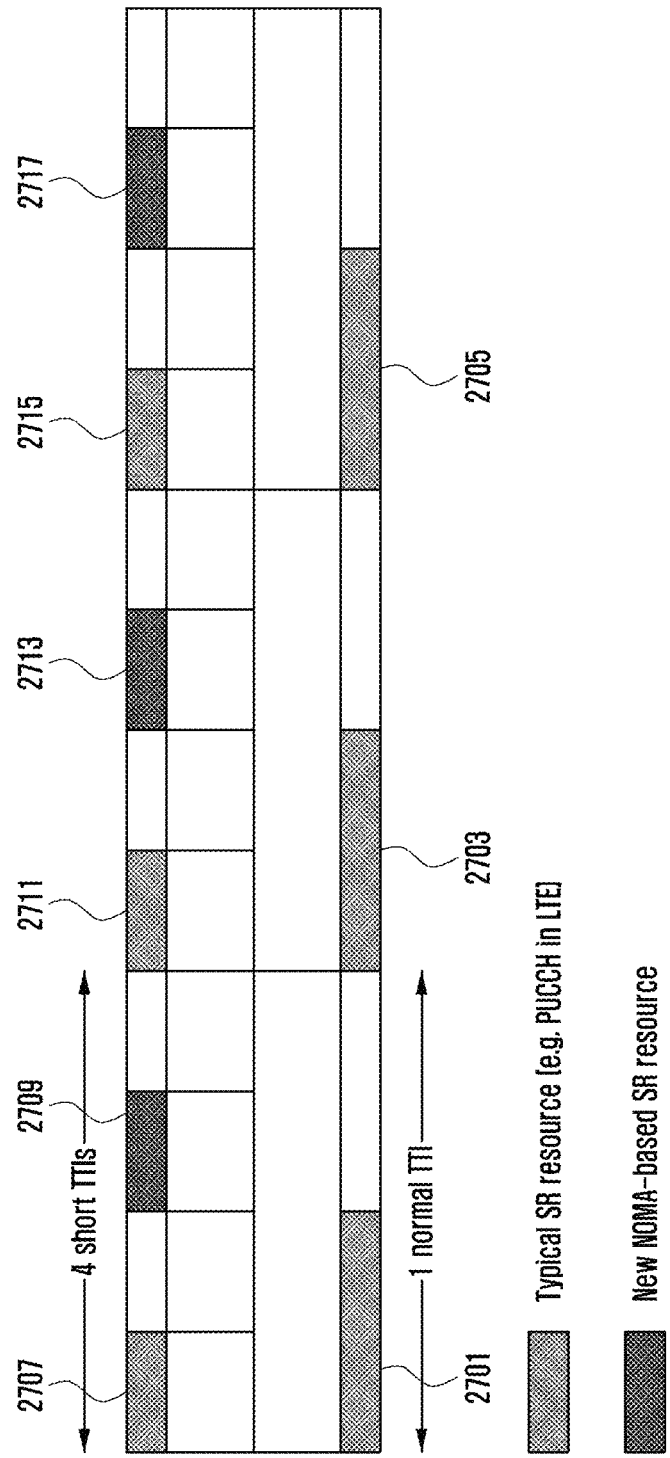
FIG. 27 illustrates coexistence between SR resources and NOMA-based SR resources according to another embodiment of the present disclosure.

FIG. 26 illustrates coexistence between SR resources and NOMA-based SR resources according to an embodiment of the present disclosure. FIG. 27 depicts coexistence between SR resources and NOMA-based SR resources according to another embodiment of the present disclosure.

Here, (a) an existing SR resource dedicated to a specific UE and (b) a new SR resource commonly allocated to one or more UEs based on NOMA coexist on a subframe basis (FIG. 26), or coexist on a short/normal TTI basis within one subframe (FIG. 27). To this end, the NB notifies the UE of configuration information of the SR resource such as (a) and configuration information of the SR resource such as (b). Here, the configuration information may include information regarding the time when the SR resource exists (symbol, slot, TTI, subframe, frame), the frequency (subcarrier, RE, RB, subband), the period, and the type ((a) or (b)).

In the present disclosure, scheduling request operation in a 5G mobile communication system is examined. In a 5G mobile communication system, it is expected that many services will be supported by one radio access network and the core network. For example, service 1 may be an enhanced mobile broadband (eMBB) service, service 2 may be an ultra-reliable and low-latency communication (URLLC) service, and service 3 may be an enhanced MTC (eMTC) service. Other services may be further supported. These services may have different physical layer characteristics (e.g., subcarrier spacing). Hence, the NB may allocate an independent SR resource for each service of the UE or allocate an SR resource that can be commonly used for all services.

Figure 28:
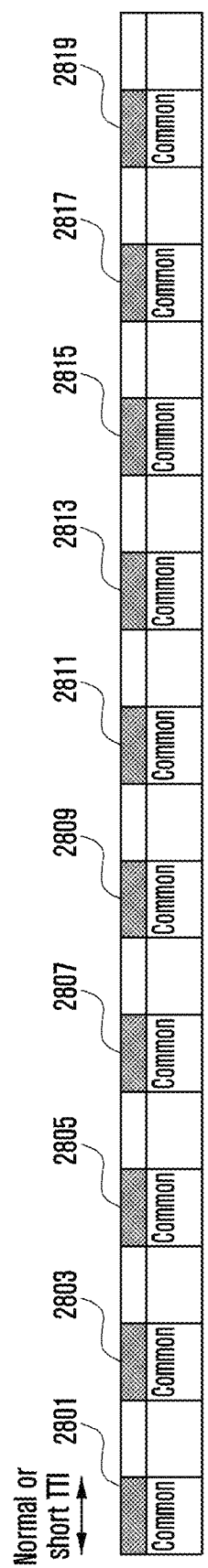
FIG. 28 illustrates usage of SR resources on a per-service basis according to an embodiment of the present disclosure.

FIG. 28 illustrates usage of SR resources on a per-service basis according to an embodiment of the present disclosure. In FIG. 28, all SR resources 2801 to 2819 allocated to the UE may be commonly used for all services.

Figure 29:
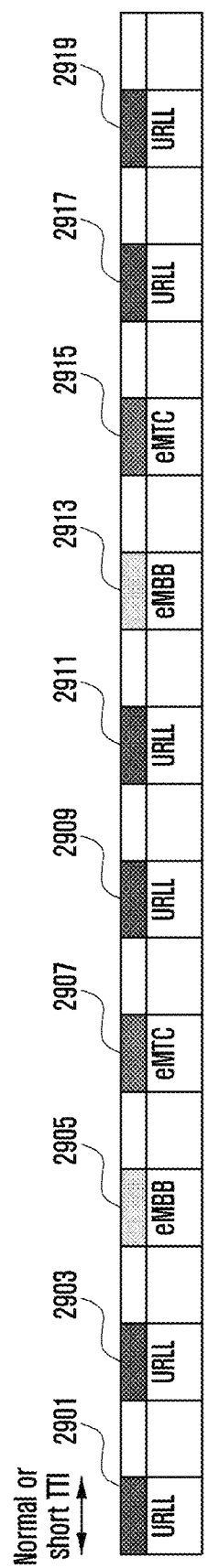
FIG. 29 illustrates usage of SR resources on a per-service basis according to another embodiment of the present disclosure.

FIG. 29 illustrates usage of SR resources on a per-service basis according to another embodiment of the present disclosure. In FIG. 29, each of SR resources 2901 to 2919 allocated to the UE may be used for the corresponding service.

Figure 30:
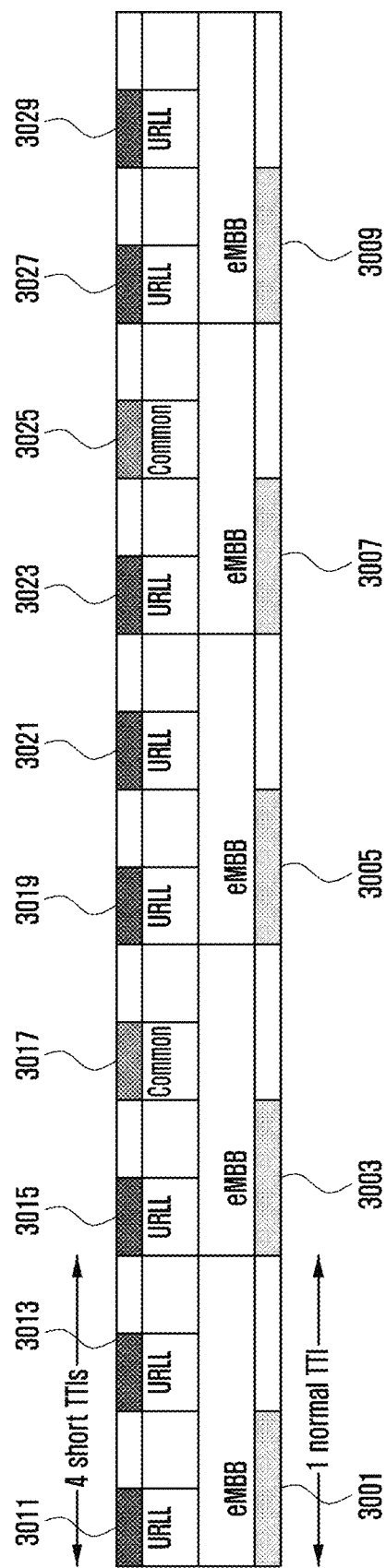
FIG. 30 illustrates usage of SR resources on a per-service basis according to another embodiment of the present disclosure.

FIG. 30 illustrates usage of SR resources on a per-service basis according to another embodiment of the present disclosure. In FIG. 30, some of SR resources allocated on different TTIs may be commonly used for all services, and the others may be used for the corresponding services.

Figure 31:
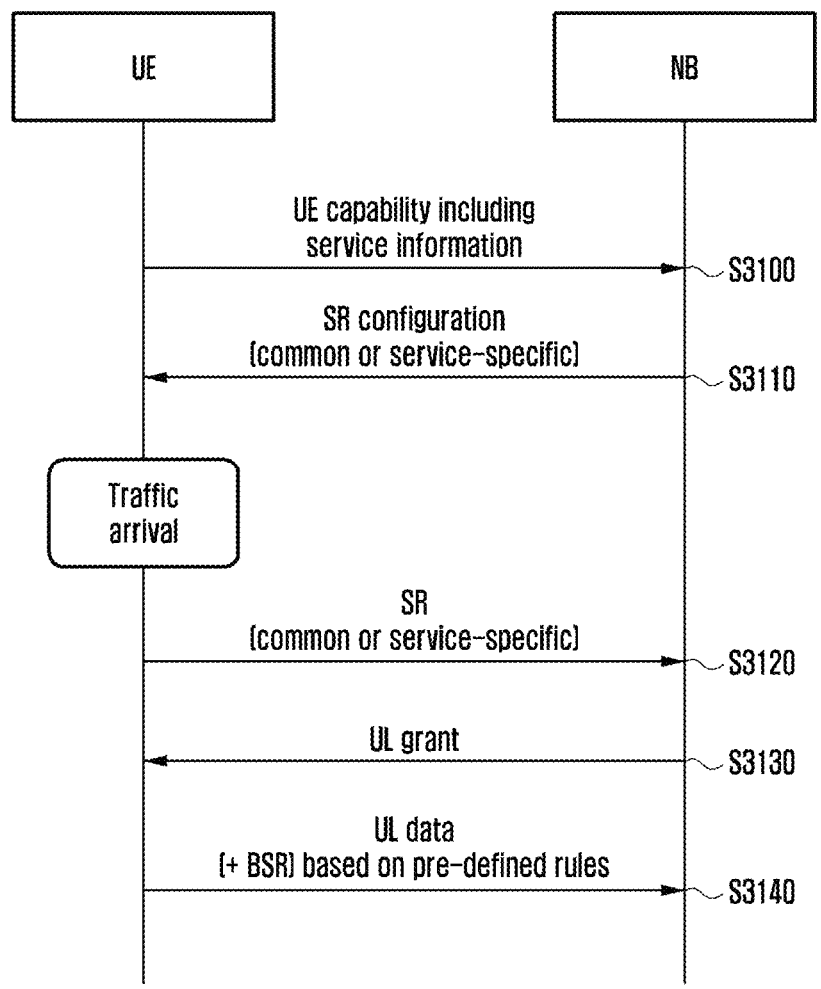
FIG. 31 illustrates a sequence diagram depicting a procedure for SR transmission and reception according to an embodiment of the present disclosure.

FIG. 31 illustrates a sequence diagram depicting a procedure for SR transmission and reception according to an embodiment of the present disclosure.

With reference to FIG. 31, at step S3000, the UE may transmit UE capability information including information on services used (or to be used) to the NB.

After identifying the services used by the UE, at step S3100, the NB may transmit common SR configuration or service-specific SR configuration information to the UE. This may be achieved by using the following information element (IE) SchedulingRequestConfig.

- SchedulingRequestConfig

The IE SchedulingRequestConfig is used to specify the Scheduling Request related parameters SchedulingRequestConfig information element

```
-- ASN1START
SchedulingRequestConfigCommon ::=          CHOICE {
    release                                NULL,
    setup                                  SEQUENCE {
        sr-PUCCH-ResourceIndexCommon           INTEGER (0..2047),
        sr-ConfigIndexCommon                   INTEGER (0..157),
        dsr-TransMaxCommon                     ENUMERATED {
                                               n4, n8, n16, n32, n64, spare3, spare2, spare1},
        sr-ProhibitTimerCommon                 INTEGER (0..7)
    }
}
SchedulingRequestConfigService1 ::=        CHOICE {
    release                                NULL,
    setup                                  SEQUENCE {
        sr-PUCCH-ResourceIndexService1         INTEGER (0..2047),
        sr-ConfigIndexService1                 INTEGER (0..157),
        dsr-TransMaxService1                   ENUMERATED {
                                               n4, n8, n16, n32, n64, spare3, spare2, spare1}
        sr-ProhibitTimerService1           INTEGER (0..7)
    }
}
SchedulingRequestConfigService2 ::=        CHOICE {
    release                                NULL,
    setup                                  SEQUENCE {
        sr-PUCCH-ResourceIndexService2         INTEGER (0..2047),
        sr-ConfigIndexService2                 INTEGER (0..157),
        dsr-TransMaxService2                   ENUMERATED {
                                               n4, n8, n16, n32, n64, spare3, spare2, spare1},
        sr-ProhibitTimerService2               INTEGER (0..7)
    }
}
SchedulingRequestConfigService3 ::=        CHOICE {
    release                                NULL,
    setup                                  SEQUENCE {
        sr-PUCCH-ResourceIndexService3         INTEGER (0..2047),
        sr-ConfigIndexService3                 INTEGER (0..157),
        dsr-TransMaxService3                   ENUMERATED {
                                               n4, n8, n16, n32, n64, spare3, spare2, spare1},
        sr-ProhibitTimerService3               INTEGER (0..7)|
    }
...
}
-- ASN1STOP
```

If the UE uses N different services, the NB may allocate one service-specific SR resource or more or less than one service-specific SR resource for each service. The NB may also allocate zero or one or more common SR resources.

When UL traffic associated with a specific service is generated after reception of the SR configuration information, at step S3200, the UE may select one of the allocated SR resources and transmit an SR to the NB using the selected SR resource.

<When the UE Uses One Service>

The UE can transmit the SR to the NB through a service-specific SR resource allocated for the corresponding service. The UE can also transmit the SR to the NB through a common SR resource.

As an example for using a common SR resource, if a service-specific SR resource allocated after T1 subframes and a common SR resource is allocated after T2 subframes (T2 being less than T1), the UE may use the common SR resource to reduce the waiting time for the service-specific SR resource.

<When the UE Uses Two or More Services and Traffic of One Service is in the Buffer>

The UE can transmit the SR to the NB through a service-specific SR resource allocated for the corresponding service. The UE can also transmit the SR to the NB through a common SR resource.

<When the UE Uses Two or More Services and Traffic of Two or More Services is in the Buffer>

The UE can transmit the SR to the NB through a service-specific SR resource allocated for the high-priority service.

The NB may assign a priority to each service and notify the UE of the priority. For example, service 1 may be assigned a first priority, service 2 may be assigned a second priority, and service 3 may be assigned a third priority.

The UE may assign a priority to each service and notify the NB of the priority.

The UE can transmit the SR to the NB through an SR resource allocated first among the service-specific SR resources corresponding to all services whose data is present in the buffer.

The UE can also transmit the SR to the NB through an SR resource randomly selected from among the service-specific SR resources corresponding to all services whose data is present in the buffer. The UE can also transmit the SR to the NB through each of the service-specific SR resources corresponding to all services whose data is present in the buffer.

The UE can transmit the SR to the NB through a common SR resource.

Upon reception of an SR from the UE, at step S3300, the NB may allocate an uplink grant to the UE.

<When the NB Receives an SR Through a Service-Specific SR Resource>

The NB may identify the type of the service being used by the UE, and may allocate an uplink grant matching the service type to the UE.

<When the NB Receives an SR Through a Common SR Resource>

As the NB cannot identify the type of the service being used by the UE, the NB may allocate an uplink grant with a given resource size to the UE.

After reception of an uplink grant from the NB, the UE may transmit data to the NB.

The UE may include the traffic of the higher-priority service first in the allocated resource according to the service priority.

When the UE has transmitted an SR to the NB through a service-specific SR resource associated with a specific service to transmit traffic of the service, the UE may include the traffic of the service first in the allocated resource.

In the present disclosure, when the UE transmits a BSR to the NB, the NB can distinguish the BSR for each service. An example of this is shown below.

Table 2 below illustrates a format used by the UE to report the buffer status to the NB for all services used by the UE and all LCGs belonging to the services.

TABLE 2

| Level 1 | Level 2 | Level 3 |
|---|---|---|
| Service ID #1 | LCG ID #0 | Buffer size |
| | LCG ID #1 | Buffer size |
| | . . . | |
| | LCG ID #$M_1$ | Buffer size |
| Service ID #2 | LCG ID #0 | Buffer size |
| | LCG ID #1 | Buffer size |
| | . . . | |
| | LCG ID #$M_2$ | Buffer size |
| Service ID #n | LCG ID #0 | Buffer size |
| | LCG ID #1 | Buffer size |
| | . . . | |
| | LCG ID #$M_n$ | Buffer size |

Table 3 below illustrates a format used by the UE to report the buffer status to the NB for some services and all LCGs belonging to those services.

TABLE 3

| Level 1 | Level 2 | Level 3 |
|---|---|---|
| Service ID #2 | LCG ID #0 | Buffer size |
| | LCG ID #1 | Buffer size |
| | . . . | |
| | LCG ID #$M_2$ | Buffer size |
| Service ID #4 | LCG ID #0 | Buffer size |
| | LCG ID #1 | Buffer size |
| | . . . | |
| | LCG ID #$M_4$ | Buffer size |

Table 4 below illustrates a format used by the UE to report the buffer status to the NB for a specific service and all LCGs belonging to the service.

TABLE 4

| Level 1 | Level 2 | Level 3 |
|---|---|---|
| Service ID #2 | LCG ID #0 | Buffer size |
| | LCG ID #1 | Buffer size |
| | . . . | |
| | LCG ID #$M_2$ | Buffer size |

Table 5 below illustrates a format used by the UE to report the buffer status to the NB for a specific service and one or some LCGs belonging to the service.

TABLE 5

| Level 1 | Level 2 | Level 3 |
|---|---|---|
| Service ID #2 | LCG ID #1 | Buffer size |

The UE may report the BSR for all services to the BS or may report the BSR for a selected service to the BS in the following manner.

When transmitting a padding BSR to the NB, the UE may report the BSR corresponding to the type of a currently used service. When there are service-specific priorities and the size of the resource used to send the BSR is limited, the BSR may be sent in the order of service priority. In addition, the BSR for all services may be reported to the NB at the same frequency.

Addition 3

In the above description for buffer status reporting, the present disclosure has discussed the method and format to report the buffer status for all currently used services, the method and format to report the buffer status for a specific service, and the method and format to report the buffer status for a specific logical channel group (LCG). In LTE, the buffer status is reported on the basis of an LCG including multiple logical channels. In order for the UE to provide more detailed buffer status information to the NB, the present disclosure includes a method of reporting the buffer status on the basis of a logical channel (LCH), which may be considered to be a lower concept than the LCG. This may be the same in principle and method of reporting the buffer status on an LCG basis, but the reporting unit is changed from LCG to LCH.

The following table illustrates a format used by the UE to report the buffer status to the NB for all services used by the UE and all LCGs and LCHs belonging to the services.

| Level 1 | Level 2 | Level 3 | Level 4 |
|---|---|---|---|
| Service ID #0 | LCG ID #0 | LCH ID #0 | Buffer size |
| | | LCH ID #1 | Buffer size |
| | | . . . | . . . |
| | | LCH ID #$N_0$ | Buffer size |
| | LCG ID #1 | LCH ID #0 | Buffer size |
| | | LCH ID #1 | Buffer size |
| | | . . . | . . . |
| | | LCH ID #$N_1$ | Buffer size |
| Service ID #1 | . . . | . . . | . . . |

The following table illustrates a format used by the UE to report the buffer status to the NB for a specific service and all LCGs and LCHs belonging to the service.

| Level 1 | Level 2 | Level 3 | Level 4 |
|---|---|---|---|
| Service ID #0 | LCG ID #0 | LCH ID #0 | Buffer size |
| | | LCH ID #1 | Buffer size |
| | | . . . | . . . |
| | | LCH ID #$N_0$ | Buffer size |
| | LCG ID #1 | LCH ID #0 | Buffer size |
| | | LCH ID #1 | Buffer size |
| | | . . . | . . . |
| | | LCH ID #$N_1$ | Buffer size |

The following table illustrates a format used by the UE to report the buffer status to the NB for a specific service, a specific LCG belonging to the service, and all LCHs belonging to the LCG.

| Level 1 | Level 2 | Level 3 | Level 4 |
|---|---|---|---|
| Service ID #0 | LCG ID #0 | LCH ID #0 | Buffer size |
| | | LCH ID #1 | Buffer size |
| | | ... | ... |
| | | LCH ID #$N_0$ | Buffer size |

The following table illustrates a format used by the UE to report the buffer status to the NB for a specific service, a specific LCG belonging to the service, and a specific LCH belonging to the LCG.

| Level 1 | Level 2 | Level 3 | Level 4 |
|---|---|---|---|
| Service ID #0 | LCG ID #0 | LCH ID #1 | Buffer size |

The present disclosure includes information on which of the various BSR formats described above will be used by the UE to report the buffer status.

I. The UE determines the BSR format according to the numerology or subcarrier spacing of the uplink resource allocated from the NB for BSR transmission.
   a. For example, when the UE is allocated an uplink resource with a subcarrier spacing of 60 kHz, the UE may report the buffer status to the NB using the BSR format corresponding to the subcarrier spacing. Here, the mapping between the numerology (or subcarrier spacing) and the BSR format may be predefined in the standard or may be notified by the NB to the UE in advance through an RRC message or the like.

II. The UE determines the BSR format according to the TTI length of the uplink resource allocated from the NB for BSR transmission.
   a. For example, when the UE is allocated an uplink resource with a TTI length of 0.25 ms, the UE may report the buffer status to the NB using the BSR format corresponding to the TTI length. Here, the mapping between the TTI length and the BSR format may be predefined in the standard or may be notified by the NB to the UE in advance through an RRC message or the like.

III. The UE determines the BSR format according to the size of the uplink resource allocated from the NB for BSR transmission.
   a. For example, when the UE is allocated 10 resource blocks (RB), the UE may report the buffer status to the NB using the BSR format corresponding to the number of allocated RBs. Here, the mapping between the uplink resource size and the BSR format may be predefined in the standard or may be notified by the NB to the UE in advance through an RRC message or the like.

IV. The UE determines the BSR format according to the numerology or subcarrier spacing of the uplink resource used for SR signal transmission.
   a. For example, when the UE has transmitted the SR signal using an uplink resource with a subcarrier spacing of 60 kHz, later, the UE may report the buffer status to the NB using the BSR format corresponding to the subcarrier spacing. Here, the mapping between the numerology (or subcarrier spacing) and the BSR format may be predefined in the standard or may be notified by the NB to the UE in advance through an RRC message or the like.

V. The UE determines the BSR format according to the TTI length of the uplink resource used for SR signal transmission.
   a. For example, when the UE is allocated an uplink resource with a TTI length of 0.25 ms, the UE may report the buffer status to the NB using the BSR format corresponding to the TTI length. Here, the mapping between the TTI length and the BSR format may be predefined in the standard or may be notified by the NB to the UE in advance through an RRC message or the like.

VI. The NB notifies the UE of the BSR format to be used when the UE reports the buffer status through an RRC message or a MAC CE (control element).

VII. The UE determines the BSR format according to the change of the buffer status by comparing the previously transmitted BSR with the current buffer status.
   a. The UE may include, in the BSR to be reported to the NB, buffer status information of the LCH where a change of X bytes or more has occurred with respect to the previously transmitted BSR.
   b. The UE may include, in the BSR to be reported to the NB, buffer status information of LCHs belonging to the LCG where a change of Y bytes or more has occurred with respect to the previously transmitted BSR. Here, the buffer status of an LCG may be given by the sum of the buffer status of individual LCHs belonging to the LCG.
   c. The UE may include, in the BSR to be reported to the NB, buffer status information of LCHs belonging to the LCG of the service where a change of Z bytes or more has occurred with respect to the previously transmitted BSR. Here, the buffer status of a service may be given by the sum of the buffer status of individual LCGs belonging to the service.

VIII. Here, the NB may notify the UE of the values X, Y and Z through an RRC message or a MAC CE.

IX. The UE determines the BSR format according to the type of a service, LCG or LCH that generates uplink data within a given time from the BSR transmission time.
   a. The UE may include, in the BSR to be reported to the NB, buffer status information of the service, LCG or LCH that generates uplink data of a given size or more within a given time from the BSR transmission time.

Addition 4

The present disclosure has proposed a scheme where, when the scheduling request signal is composed of plural bits, the combination of the bits is associated with the buffer status of the UE. Hence, when the NB receives a scheduling request signal composed of multiple bits, it can identify not only the necessity of uplink transmission but also buffer status information of the UE. However, this needs more time/frequency radio resources (e.g., PUCCH, PUSCH, PRACH) compared with a scheduling request signal composed of a single bit.

The present disclosure has proposed a scheme where a 1-bit scheduling request signal is transmitted at a different time, frequency, or code resource. When a 1-bit scheduling request is received by the NB, the NB may acquire buffer status information of the UE by checking the received time, frequency, or code resource. Here, the mapping between the time, frequency, or code resource used for transmitting or receiving the 1-bit scheduling request signal and the buffer status report may be determined through negotiation between the UE and the NB via an RRC message or a MAC control element. Transmitting a 1-bit scheduling request signal needs less time/frequency radio resources compared with transmitting a multi-bit scheduling request signal. However, the resolution or granularity of the buffer status represented by the mapping between the 1-bit scheduling request signal and the time, frequency, or code resource used for transmitting the 1-bit scheduling request signal may be poorer than that of the buffer status represented by a multi-bit scheduling request signal.

The above may be summarized as follows. Using a multi-bit scheduling request signal has an advantage of finely representing the buffer status but has a disadvantage of large overhead. On the other hand, using the mapping between a 1-bit scheduling request signal and the time/frequency/code resource used for transmitting or receiving the 1-bit scheduling request signal has an advantage of small overhead but has a disadvantage of poorly representing the buffer status. Hence, the present disclosure includes embodiments utilizing these two methods together. To this end, the NB and the UE may operate as follows.

First, the NB and the UE configure a multi-bit scheduling request signal. To this end, the NB provides the UE with the following information through an RRC message or the like.

I. The number of bits constituting the multi-bit scheduling request signal

II. Radio resource allocation information for transmitting the multi-bit scheduling request signal (including the resource allocation period)

III. Other information provided by the NB to the UE for configuring the scheduling request signal in LTE: sr-PUCCH-ResourceIndex, sr-ConfigIndex, dsr-TransMax, sr-ProhibitTimer, and logicalChannelSR-ProhibitTimer Here, the NB may notify the UE of the buffer status associated with each bit combination of the multi-bit scheduling request signal. For example, in the case of a four-bit scheduling request signal, the NB may provide the UE with the following information (FIG. 13A).

| Configurable by RRC | |
|---|---|
| SR bit combination (using 4 bits) | Buffer status |
| 0000 | 0 < BS < 500 |
| 0001 | 500 < BS < 1000 |
| 0010 | 1000 < BS < 1500 |
| 0011 | 1500 < BS < 2000 |
| 0100 | 2000 < BS < 2500 |
| ... | ... |
| 1111 | 7500 < BS < 8000 |

Figure 32:
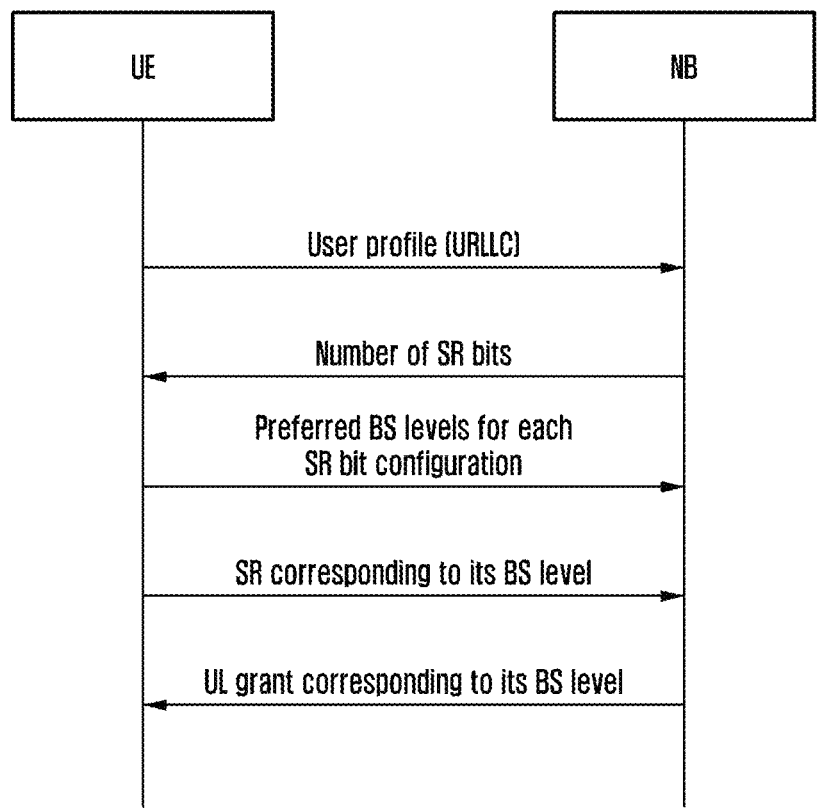
FIG. 32 illustrates a sequence diagram depicting a procedure for transmitting and receiving information on the multi-bit SR signal according to an embodiment of the present disclosure.

FIG. 32 illustrates a sequence diagram depicting a procedure for transmitting and receiving information on the multi-bit SR signal according to an embodiment of the present disclosure.

The NB and the UE may determine the buffer status associated with each bit combination of the multi-bit scheduling request signal through negotiation. This is illustrated in FIG. 32.

In FIG. 32, the NB notifies the UE of the number of bits constituting the scheduling request signal, and the UE notifies the NB of buffer status levels corresponding to individual bit combinations of the multi-bit scheduling request signal (as shown in FIG. 13A) through an RRC message or a MAC control element.

Next, the NB and the UE configure a 1-bit scheduling request signal.

Radio resource allocation information for transmitting the 1-bit scheduling request signal (including the resource allocation period)

Figure 33A:
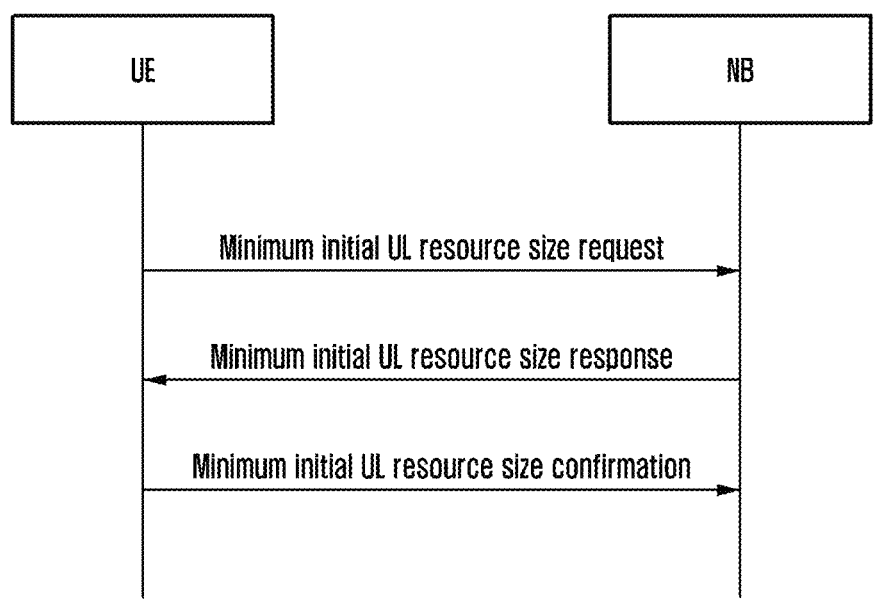
FIG. 33A illustrates a sequence diagram depicting a procedure for transmitting and receiving information on the minimum initial uplink resource size according to an embodiment of the present disclosure.

Other information provided by the NB to the UE for configuring the scheduling request signal in LTE: sr-PUCCH-ResourceIndex, sr-ConfigIndex, dsr-TransMax, sr-ProhibitTimer, and logicalChannelSR-ProhibitTimer FIG. 33A illustrates a sequence diagram depicting a procedure for transmitting and receiving information on the minimum initial uplink resource size according to an embodiment of the present disclosure.

The NB and the UE may determine, through negotiation, the minimum size of the UL resource to be allocated to the UE when the NB receives a 1-bit scheduling request signal. Such negotiation can be performed by exchanging RRC messages or MAC control elements between the NB and the UE. This is illustrated in FIG. 33a.

As an embodiment, the NB requests the UE to provide information on the minimum initial size of the uplink resource to be allocated when the UE transmits a 1-bit scheduling request signal. Upon reception of the request, the UE provides the NB with information on the minimum initial size of the uplink resource to be allocated when the UE transmits a 1-bit scheduling request signal. The minimum initial uplink resource size may be experimentally identified and determined by analyzing the pattern of uplink traffic generated by the UE (data size, generation time, inter-arrival time). Upon reception of the minimum initial uplink resource size information, the NB determines the minimum initial size of the uplink resource that can be actually allocable to the UE and notifies the UE of the value.

As another embodiment, when the UE transmits a multi-bit SR signal, some of the SR bits may represent information related to the type of uplink traffic and the remaining SR bits may represent information related to the buffer status. For example, if the SR signal is composed of 6 bits, two bits of the 6 bits may represent the type of uplink traffic (LCH, LCG, network slice, QoS class, numerology, TTI, application type, etc.), and four bits thereof may represent the buffer status corresponding to the uplink traffic type. When the NB receives an SR signal having information on the type of uplink traffic and the buffer status information of the uplink traffic from the UE, the NB may allocate an uplink resource suitable for the UE to transmit the corresponding uplink traffic.

Hereinabove, a description is given of utilizing two types of scheduling request signals together by configuring a multi-bit scheduling request signal and a 1-bit scheduling request signal. Generally, in the case of a URLLC service, it is desirable for the UE to have an opportunity for transmitting the scheduling request signal frequently in a short time interval. This is because the waiting time for the UE to transmit the scheduling request signal is also included in the latency. In this respect, for a URLLC service, frequent allocation of an opportunity for transmitting a 1-bit scheduling request signal may cause less radio resource overhead than frequent allocation of an opportunity for transmitting a multi-bit scheduling request signal. Likewise, in the case of an eMBB service, as latency is not the most important factor, there is no need for very frequent allocation of an opportunity to transmit a scheduling request signal. Hence, for an eMBB service, it is advantageous to allocate an opportunity for transmitting a multi-bit scheduling request at appropriate (not too short) time intervals. In this way, the scheduling request signals of the appropriate type may be different for different services. As such, when the NB configures scheduling request signals to the UE, the NB may indicate which scheduling request signal is available for which service. In this case, the service may correspond to a logical channel. Consequently, when the NB configures scheduling request signals to the UE, the NB can indicate which scheduling request signal is available for which logical channel (or, logical channel group, network slice, QoS class identifier). This information is illustrated below.

class, uplink traffic type, numerology, TTI, application type) indicated by the NB. The default SR configuration is an SR configuration applied to a specific LCH (or LCG, network slice, QoS class, uplink traffic type, numerology, TTI, application type) except for the specific LCH (or LCG, network slice, QoS class, uplink traffic type, numerology, TTI, application type) indicated by the special SR configuration.

```
    - SchedulingRequestConfig
                    SchedulingRequestConfig information element
-- ASN1START
SchedulingRequestConfigType1 ::=        CHOICE {
    release                                 NULL,
    setup                                   SEQUENCE {
        sr-PUCCH-ResourceIndexType1             INTEGER (0..2047),
        sr-ConfigIndexType1                     INTEGER (0..157),
        dsr-TransMaxType1                       ENUMERATED {
                                                n4, n8, n16, n32, n64, spare3, spare2, spare1},
        sr-NumberOfBitsType1                    INTEGER (0..15),
        sr-PeriodType1                          INTEGER (0..15),
        sr-ServiceMappingType1                  ENUMERATED {service1, service 3, service 5},
        sr-LogicalChannelMappingType1           ENUMERATED {LCH1, LCH3, LCH5}
    }
}
SchedulingRequestConfigType1 ::=        CHOICE {
    release                                 NULL,
    setup                                   SEQUENCE {
        sr-PUCCH-ResourceIndexType2             INTEGER (0..2047),
        sr-ConfigIndexType2                     INTEGER (0..157),
        dsr-TransMaxType2                       ENUMERATED {
                                                n4, n8, n16, n32, n64, spare3, spare2, spare1},
        sr-NumberOfBitsType2                    INTEGER (0..15),
        sr-PeriodType2                          INTEGER (0..15),
        sr-ServiceMappingType2                  ENUMERATED {service2, service5, service6},
        sr-LogicalChannelMappingType2           ENUMERATED {LCH2, LCH4, LCH6}
    }
...
}
-- ASN1STOP
```

In above SchedulingRequestConfig IE, sr-NumberOfBits indicates the number of bits constituting a scheduling request signal. When sr-NumberOfBits is set to 1, this indicates a 1-bit scheduling request signal; and when sr-NumberOfBits is set to a value greater than 1, this indicates a multi-bit scheduling request signal. sr-Period indicates the period (subframe or TTI or time unit) during which a scheduling request transmission resource is allocated. sr-ServiceMapping indicates the service type corresponding to a scheduling request type. In the above example, service 1, 3 and 5 are associated with SchedulingRequestConfigType1, and service 2, 4 and 6 are associated with SchedulingRequestConfigType2. sr-LogicalChannelMapping indicates the logical channel type corresponding to a scheduling request type. In the above example, logical channel 1, 3 and 5 are associated with SchedulingRequestConfigType1, and logical channel 2, 4 and 6 are associated with SchedulingRequestConfigType2. In a similar way, the NB can indicate which scheduling request type is available for which logical channel group type, network slice type, QoS class identifier type, uplink traffic type, numerology type, TTI type, or application type.

As an extended form, the NB can provide the UE with a default SR configuration and a special SR configuration. Here, the special SR configuration is an SR configuration applied only to a specific LCH (or LCG, network slice, QoS For example, as shown below, assume that the NB provides the UE with a default SR configuration and a special SR configuration applied to service 2, LCH 2, or LCH 4. Then, to transmit uplink data occurring at service 2, LCH 2, or LCH 4, the UE may transmit an SR signal by using information contained in the special SR configuration (e.g. PUCCH resource index, SR configuration index, maximum transmission count, SR bit count, SR period). To transmit uplink data occurring at a service or LCH except for service 2, LCH 2, or LCH 4, the UE may transmit an SR signal by using information contained in the default SR configuration (e.g. PUCCH resource index, SR configuration index, maximum transmission count, SR bit count, SR period).

In the above example, upon reception of an SR signal from the UE, the NB may identify the SR configuration used to transmit the SR signal. That is, the NB may examine the PUCCH resource index, SR configuration index, SR bit count, and SR period of the received SR signal to determine whether the default SR configuration or the special SR configuration is used for SR signal transmission. Upon determining that the special SR configuration is used for SR signal transmission, the NB may identify a specific service or LCH (or LCG, network slice, QoS class, uplink traffic type, numerology, TTI, application type) indicated by the special SR configuration. Thereby, the NB can allocate an uplink resource suitable for the UE to transmit the uplink data.

- SchedulingRequestConfig

-continued

```
                    SchedulingRequestConfig information element
-- ASN1START
SchedulingRequestConfigDefault ::=    CHOICE {
    release                           NULL,
    setup                             SEQUENCE {
        sr-PUCCH-ResourceIndexDefault     INTEGER (0..2047),
        sr-ConfigIndexDefault             INTEGER (0..157),
        dsr-TransMaxDefault               ENUMERATED {
                                              n4, n8, n16, n32, n64, spare3, spare2, spare1},
        sr-NumberOfBitsDefault            INTEGER (0..15),
        sr-PeriodDefault                  INTEGER (0..15),
        sr-ProhibitTimerDefault           INTEGER (0..7)
    }
}
SchedulingRequestConfigType1 ::=      CHOICE {
    release                           NULL,
    setup                             SEQUENCE {
        sr-PUCCH-ResourceIndexType1       INTEGER (0..2047),
        sr-ConfigIndexType1               INTEGER (0..157),
        dsr-TransMaxType1                 ENUMERATED {
                                              n4, n8, n16, n32, n64, spare3, spare2, spare1},
        sr-NumberOfBitsType1              INTEGER (0..15),
        sr-PeriodType1                    INTEGER (0..15),
        sr-ServiceMappingType1            ENUMERATED {service2},
        sr-LogicalChannelMappingType1     ENUMERATED {LCH2, LCH4},
        sr-ProhibitTimerType1             INTEGER (0..7)
    }
...
}
-- ASN1STOP
```

Addition 5

Figure 33B:
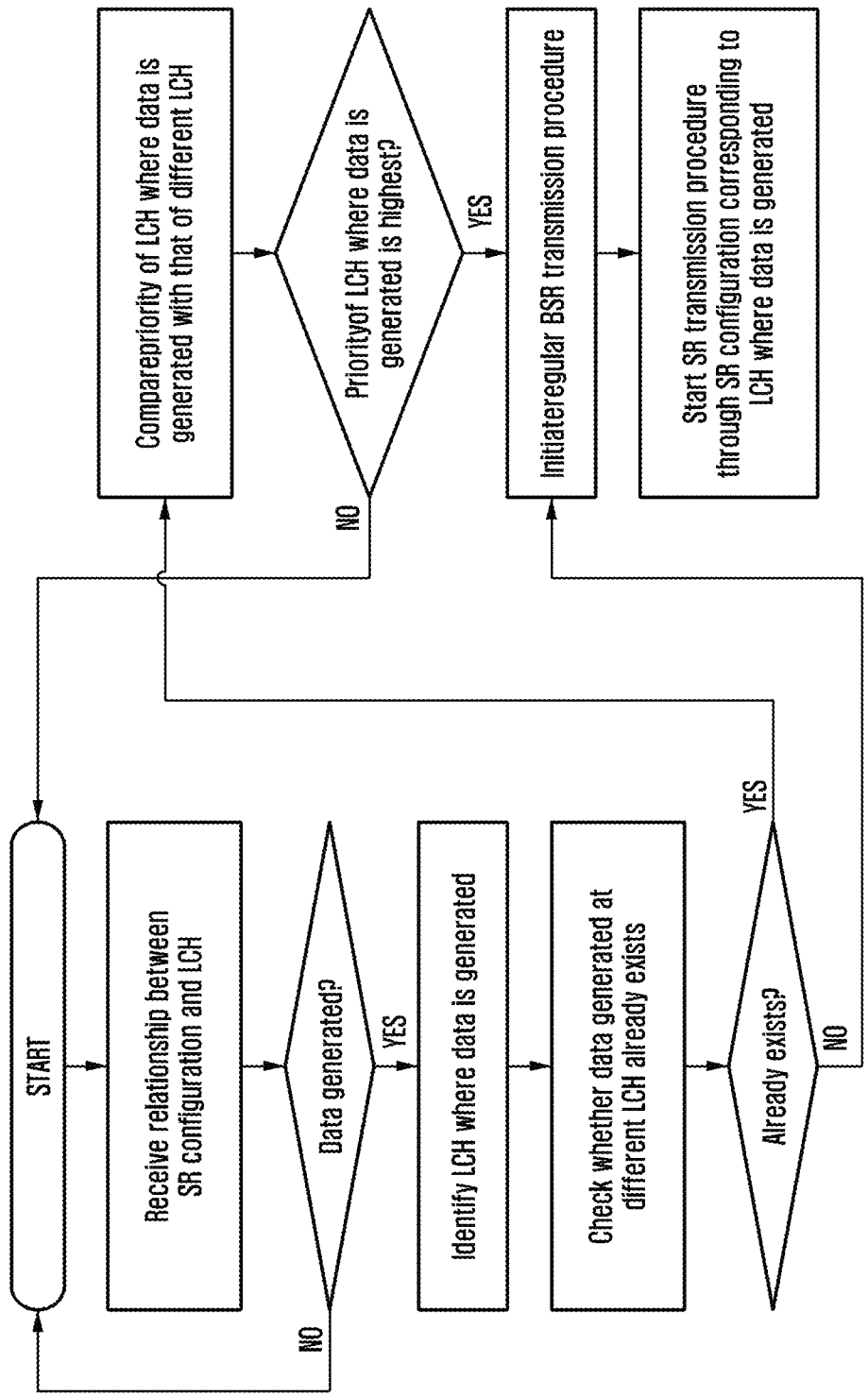
FIG. 33B illustrates an operation of a base station and a user equipment according to an embodiment of the present disclosure.

The present disclosure has proposed a scheme where a relationship is defined between SR configurations and services or logical channels, and when data is generated in a specific service or a specific logical channel, the UE transmits an SR signal through the corresponding SR configuration. When this scheme is directly applied to the BSR and SR procedures defined in LTE, the NB and the UE operate as follows. This is shown in FIG. 33B.

I. The NB provides the UE with a relationship between the SR configuration and the LCH.
  A. This information may be transmitted through SchedulingRequestConfig or LogicalChannelConfig among RRC IEs. That is, the LCH ID corresponding to each SR configuration may be added to SchedulingRequest-Config, or the SR configuration ID corresponding to each LCH may be added to LogicalChannelConfig.
  B. When data is generated at a specific LCH, the UE checks whether data generated at a different LCH already exists in the buffer.
    i. If data generated at a different LCH does not exist in the buffer, the UE initiates a regular BSR transmission procedure. After initiation of the regular BSR transmission procedure, if there is no uplink resource allocated to the UE and logicalChannelSR-ProhibitTimer is not running, the UE initiates the SR transmission procedure.
      1. Here, the SR transmission procedure is performed through the SR configuration corresponding to the LCH where the data having initiated the regular BSR transmission procedure is generated.
    ii. If data generated at a different LCH already exists in the buffer, the UE compares the priority of the LCH where data is generated with that of the different LCH.
      1. If the priority of the LCH where data is generated is higher than that of the different LCH, the UE initiates a regular BSR transmission procedure. After initiation of the regular BSR transmission procedure, if there is no uplink resource allocated to the UE and logicalChannelSR-ProhibitTimer is not running, the UE initiates the SR transmission procedure.
        A. Here, the SR transmission procedure is performed through the SR configuration corresponding to the LCH where the data having initiated the regular BSR transmission procedure is generated.
      2. If the priority of the LCH where data is generated is not higher than that of the different LCH, the UE does not initiate a regular BSR transmission procedure.

When the relationship between the logical channel and the SR configuration is represented by including the index of SchedulingRequestConfig in the LogicalChannelConfig IE defined in LTE, the LogicalChannelConfig IE and the SchedulingRequestConfig IE may be described as follows.

```
                    -LogicalChannelConfig
The IE LogicalChannelConfig is used to configure the logical channel parameters.
                    LogicalChannelConfig information element
-- ASN1START
LogicalChannelConfig ::=              SEQUENCE {
    ul-SpecificParameters                 SEQUENCE {
        priority                              INTEGER (1..16),
        prioritisedBitRate                    ENUMERATED {
                                                  kBps0, kBps8, kBps16, kBps32, kBps64,
kBps128,
```

```
                              kBps256, infinity, kBps512-v1020, kBps1024-
v1020,
                              kBps2048-v1020, spare5, spare4, spare3,
spare2,
                              spare1},
    bucketSizeDuration        ENUMERATED {
                              ms50, ms100, ms150, ms300, ms500, ms1000,
spare2,
                              spare1,}
    logicalChannelGroup       INTEGER (0..3),         OPTIONAL
  --Need OR
      schedulingRequestConfigIndex   INTEGER (1..8)
        } OPTIONAL,                                   --
Cond UL
  ...,
  [[ logicalChannelSR-Mask-r9     ENUMERATED {setup}  OPTIONAL
  -- Cond SRmask
  ]],
  [[ logicalChannelSR-Prohibit-r12   BOOLEAN          OPTIONAL
  --Need ON
  ]]
-- ASN1STOP
```

LogicalChannelConfig Field Descriptions bucketSizeDuration
Bucket Size Duration for logical channel prioritization in TS 36.321 [6].
Value in milliseconds. Value ms50 corresponds to 50 ms, ms100 corresponds to 100 ms and so on.
logicalChannelGroup
Mapping of logical channel to logical channel group for BSR reporting in TS 36.321 [6].
logicalChannelSR-Mask
Controlling SR triggering on a logical channel basis when an uplink grant is configured. See TS 36.321 [6].
logicalChannelSR-Prohibit
Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6].
prioritisedBitRate
Prioritized Bit Rate for logical channel prioritization in TS 36.321 [6].
Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2
priority
Logical channel priority in TS 36.321 [6]. Value is an integer.
schedulingRequestConfigIndex
Mapping of logical channel to SchedulingRequestConfig for a UE to perform the SR procedure in MAC specification. If data from a LCH triggers BSR and then the BSR also triggers SR, the SR procedure is performed based on the SchedulingRequestConfig that is mapped to the LCH from which data is generated. Note that each SchedulingRequestConfig has its own schedulingRequestConfigIndex.

SchedulingRequestConfig

The IE SchedulingRequestConfig is used to specify the Scheduling Request related parameters

```
                    SchedulingRequestConfig information element
-- ASN1START
SchedulingRequestConfig ::=          CHOICE {
    release                          NULL,
    setup                            SEQUENCE {
        schedulingRequestConfigIndex     INTEGER (1..8),
        sr-PUCCH-ResourceIndex           INTEGER (0..2047),
        sr-ConfigIndex                   INTEGER (0..157),
        dsr-TransMax                     ENUMERATED {
                                         n4, n8, n16, n32, n64, spare3, spare2, spare1}
    }
}
-- ASN1STOP
```

SchedulingRequestConfig Field Descriptions dsr-TransMax
Parameter for SR transmission in TS 36.321 [6, 5.4.4]. The value n4 corresponds to 4 transmissions, n8 corresponds to 8 transmissions and so on. EUTRAN configures the same value for all serving cells for which this field is configured.
sr-ConfigIndex
Parameter $I_{SR}$. See TS 36.213 [23,10.1]. The values 156 and 157 are not applicable for Release 8.
sr-PUCCH-ResourceIndex, sr-PUCCH-ResourceIndexP1
Parameter: $n_{PUCCH,SRI}^{(1,p)}$ for antenna port P0 and for antenna port P1 respectively, see TS 36.213 [23, 10.1]. E-UTRAN configures sr-PUCCH-ResourceIndexP1 only if sr-PUCCHResourceIndex is configured.
schedulingRequestConfigIndex
Index of SchedulingRequestConfig. Note that a UE can be configured with multiple SchedulingRequestConfigs and that each SchedulingRequestConfig has its own schedulingRequestConfigIndex. The mapping between a logical channel and SchedulingRequestConfig can be indicated by schedulingRequestConfigIndex.

The relationship between the logical channel and the scheduling request configuration described above is obtained by assigning an unique ID (SchedulingRequestConfigIndex) to each scheduling request configuration and inserting an ID of a scheduling request configuration corresponding to the logical channel in each logical channel configuration.

As another example, a mapping relationship between a logical channel and a scheduling request configuration may be expressed by including a logical channel ID (logical channel IDentity) already defined in the LTE standard in a scheduling request configuration. These examples are shown below.

In one embodiment, the NB processor 3410 may perform an uplink scheduling method in a mobile communication system by use of information transmitted and received through the NB receiver 3420 and the NB transmitter 3430. The NB processor 3410 may control the NB receiver 3420 to receive a scheduling request (SR) from a UE, identify the amount of data stored in the buffer of the UE on the basis of the SR, and allocate uplink resources to the UE on the basis of the identified data amount.

The NB processor 3410, which may also be referred to as a controller, can control the NB receiver 3420 and the NB transmitter 3430, and can carry out the NB operations in the embodiments shown in FIGS. 1 to 33. Here, the NB receiver 3420 and the NB transmitter 3430 may also be referred to as a transceiver.

Figure 35:
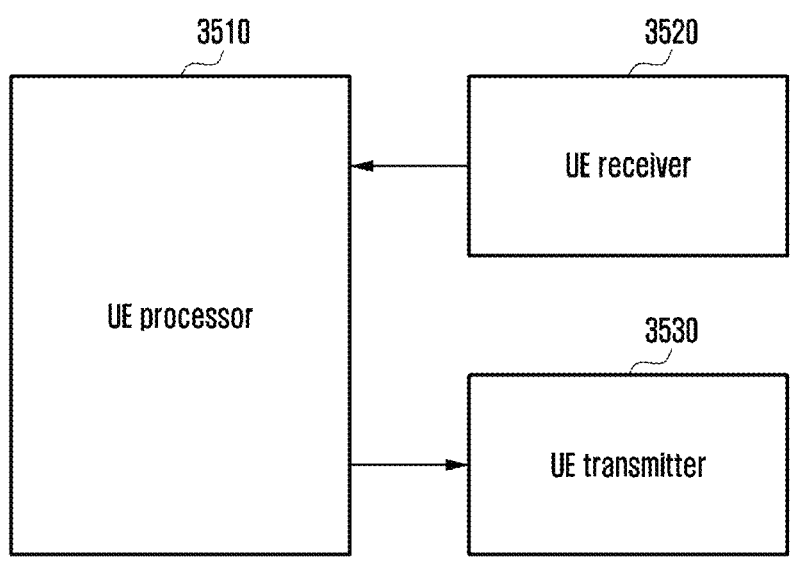
FIG. 35 illustrates a user equipment according to an embodiment of the present disclosure.

FIG. 35 illustrates a block diagram of a user equipment (UE) according to the present disclosure.

---

- SchedulingRequestConfig
The IE SchedulingRequestConfig is used to specify the Scheduling Request related parameters
        SchedulingRequestConfig information element
-- ASN1START
SchedulingRequestConfig ::=        CHOICE {
  release                                   NULL,
  setup                                    SEQUENCE {
    srLogicalChannelList        SrLogicalChannelList     OPTIONAL,
  --Need ON
    sr-PUCCH-ResourceIndex        INTEGER (0..2047),
    sr-ConfigIndex                INTEGER (0..157),
    dsr-TransMax                  ENUMERATED {
                                       n4, n8, n16, n32, n64, spare3, spare2,
spare1}
  }
}
SrLogicalChannelList ::=        SEQUENCE (SIZE (1..maxNumLogicalChannel))
OF SrLogicalChannel
SrLogicalChannel ::=            SEQUENCE {
  logicalChannelIdentity        INTEGER (3..10),
  ...
}
-- ASN1STOP

---

SchedulingRequestConfig Field Descriptions dsr-TransMax
  Parameter for SR transmission in TS 36.321 [6, 5.4.4]. The value n4 corresponds to 4 transmissions, n8 corresponds to 8 transmissions and so on. EUTRAN configures the same value for all serving cells for which this field is configured.
sr-ConfigIndex
  Parameter $I_{SR}$. See TS 36.213 [23,10.1]. The values 156 and 157 are not applicable for Release 8.
sr-PUCCH-ResourceIndex, sr-PUCCH-ResourceIndexP1
  Parameter: $n_{PUCCH,SRI}^{(1,\tilde{p})}$ for antenna port P0 and for antenna port P1 respectively, see TS 36.213 [23, 10.1]. E-UTRAN configures sr-PUCCH-ResourceIndexP1 only if sr-PUCCHResourceIndex is configured.
SrLogicalChannelList
  SrLogicalChannelList is a list of SrLogicalChannel. SrLogicalChannel indicates a logical channel identity that is mapped to SchedulingRequestConig. If UL traffic from the logical channel triggers scheduling request, the scheduling request procedure is controlled by the SchedulingRequestConfig that is mapped to the logical channel.

Figure 34:
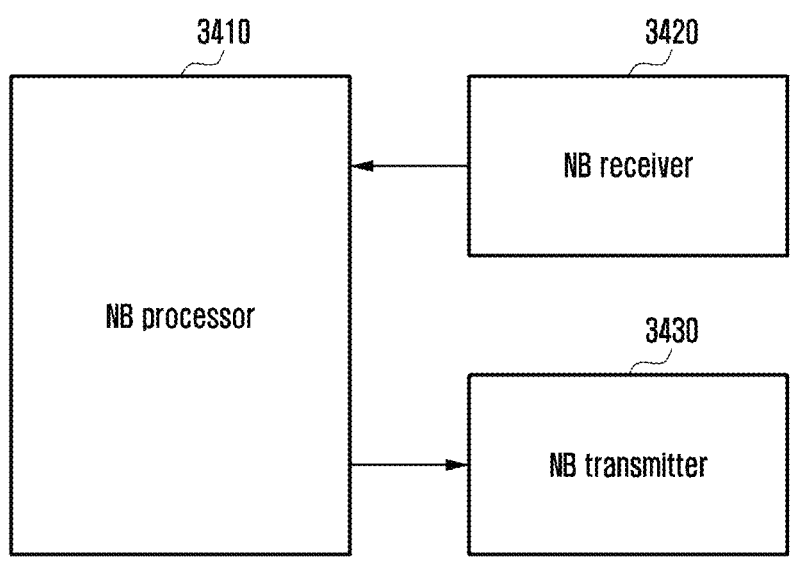
FIG. 34 illustrates a base station according to an embodiment of the present disclosure.

FIG. 34 illustrates a block diagram of a base station (NB) according to the present disclosure.

In one embodiment, the UE processor 3510 may perform an uplink scheduling method in a mobile communication system by use of information transmitted and received through the UE receiver 3520 and the UE transmitter 3530. The UE processor 3510 may control a process of identifying the amount of data stored in the buffer, generating a scheduling request (SR), and transmitting the SR to the NB on the basis of the identified data amount so that an uplink resource is to be allocated from the NB.

The UE processor 3510, which may also be referred to as a controller, can control the UE receiver 3520 and the UE transmitter 3530, and can carry out the UE operations in the embodiments shown in FIGS. 1 to 33. Here, the UE receiver 3520 and the UE transmitter 3530 may also be referred to as a transceiver.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a base station, a radio resource control (RRC) message including first information on a scheduling request (SR) configuration and for indicating a logical channel configuration of a logical channel with which the SR configuration is associated, and second information on a subcarrier spacing for the logical channel;
generating an SR for the logical channel based on the SR configuration; and
transmitting, to the base station, the SR for to the logical channel.

2. The method of claim 1, wherein the first information is further used for indicating an uplink resource to be used for the SR configuration, and
wherein the SR is transmitted by using the uplink resource on a physical uplink control channel (PUCCH).

3. The method of claim 2, wherein the uplink resource is identified by a periodicity and an offset.

4. The method of claim 1, further comprising receiving, from the base station, an uplink grant allocating an uplink resource for transmitting uplink data of the logical channel,
wherein the uplink grant allocates at least one of a time resource, a frequency resource, a spatial resource, or a transmission time interval (TTI) resource for the uplink resource for transmitting the uplink data, and
wherein the uplink data is transmitted on the uplink resource based on the subcarrier spacing identified by the second information.

5. The method of claim 1, wherein a timer for prohibiting transmitting of the SR is configured based on the RRC message, and
wherein the timer is started based on transmission of the SR.

6. A method performed by a base station in a wireless communication system, the method comprising:
transmitting, to a terminal, a radio resource control (RRC) message including first information on a scheduling request (SR) configuration and for indicating a logical channel configuration of a logical channel with which the SR configuration is associated, and second information on a subcarrier spacing for the logical channel; and
receiving, from the terminal, an SR for the logical channel based on the SR configuration.

7. The method of claim 6, wherein the first information is further used for indicating an uplink resource to be used for the SR configuration, and
wherein the SR is received by using the uplink resource on a physical uplink control channel (PUCCH).

8. The method of claim 7, wherein the uplink resource is identified by a periodicity and an offset.

9. The method of claim 6, further comprising transmitting, to the terminal, an uplink grant allocating an uplink resource for receiving uplink data of the logical channel,
wherein the uplink grant allocates at least one of a time resource, a frequency resource, a spatial resource, or a transmission time interval (TTI) resource for the uplink resource for receiving the uplink data, and
wherein the uplink data is received on the uplink resource based on the subcarrier spacing identified by the second information.

10. The method of claim 6, wherein a timer for prohibiting transmitting of the SR is configured based on the RRC message, and
wherein the timer is started based on reception of the SR.

11. A terminal in a wireless communication system, the terminal comprising:
a transceiver; and
a controller coupled with the transceiver and configured to:
receive, from a base station, a radio resource control (RRC) message including first information on a scheduling request (SR) configuration and for indicating a logical channel configuration of a logical channel with which the SR configuration is associated, and second information on a subcarrier spacing for the logical channel,
generate an SR for the logical channel based on the SR configuration,
transmit, to the base station, the SR for the logical channel.

12. The terminal of claim 11, wherein the first information is further used for indicating an uplink resource to be used for the SR configuration, and
wherein the SR is transmitted by using the uplink resource on a physical uplink control channel (PUCCH).

13. The terminal of claim 12, wherein the uplink resource is identified by a periodicity and an offset.

14. The terminal of claim 11, wherein the controller is further configured to receive, from the base station, an uplink grant allocating an uplink resource for transmitting uplink data of the logical channel,
wherein the uplink grant allocates at least one of a time resource, a frequency resource, a spatial resource, or a transmission time interval (TTI) resource for the uplink resource for transmitting the uplink data, and
wherein the uplink data is transmitted on the uplink resource based on the subcarrier spacing identified by the second information.

15. The terminal of claim 11, wherein a timer for prohibiting transmitting of the SR is configured based on the RRC message, and
wherein the timer is started based on transmission of the SR.

16. A base station in a wireless communication system, the base station comprising:
a transceiver; and
a controller coupled with the transceiver and configured to:
transmit, to a terminal, a radio resource control (RRC) message including first information on a scheduling request (SR) configuration and for indicating a logical channel configuration of a logical channel with which the SR configuration is associated, and second information on a subcarrier spacing for the logical channel, and
receive, from the terminal, an SR for the logical channel based on the SR configuration.

17. The base station of claim 16, wherein the first information is further used for indicating an uplink resource to be used for the SR configuration, and
wherein the SR is received by using the uplink resource on a physical uplink control channel (PUCCH).

18. The base station of claim 17, wherein the uplink resource is identified by a periodicity and an offset.

19. The base station of claim 16, wherein the controller is further configured to transmit, to the terminal, an uplink grant allocating an uplink resource for receiving uplink data of the logical channel,
  wherein the uplink grant allocates at least one of a time resource, a frequency resource, a spatial resource, or a transmission time interval (TTI) resource for the uplink resource for receiving the uplink data, and
  wherein the uplink data is received on the uplink resource based on the subcarrier spacing identified by the second information.

20. The base station of claim 16, wherein a timer for prohibiting transmitting of the SR is configured based on the RRC message, and
  wherein the timer is started based on reception of the SR.

* * * * *